Dec. 19, 1967 J. G. BENJAMIN 3,358,554
FEEDING APPARATUS FOR SHEET MATERIAL
Filed May 28, 1965 8 Sheets-Sheet 1
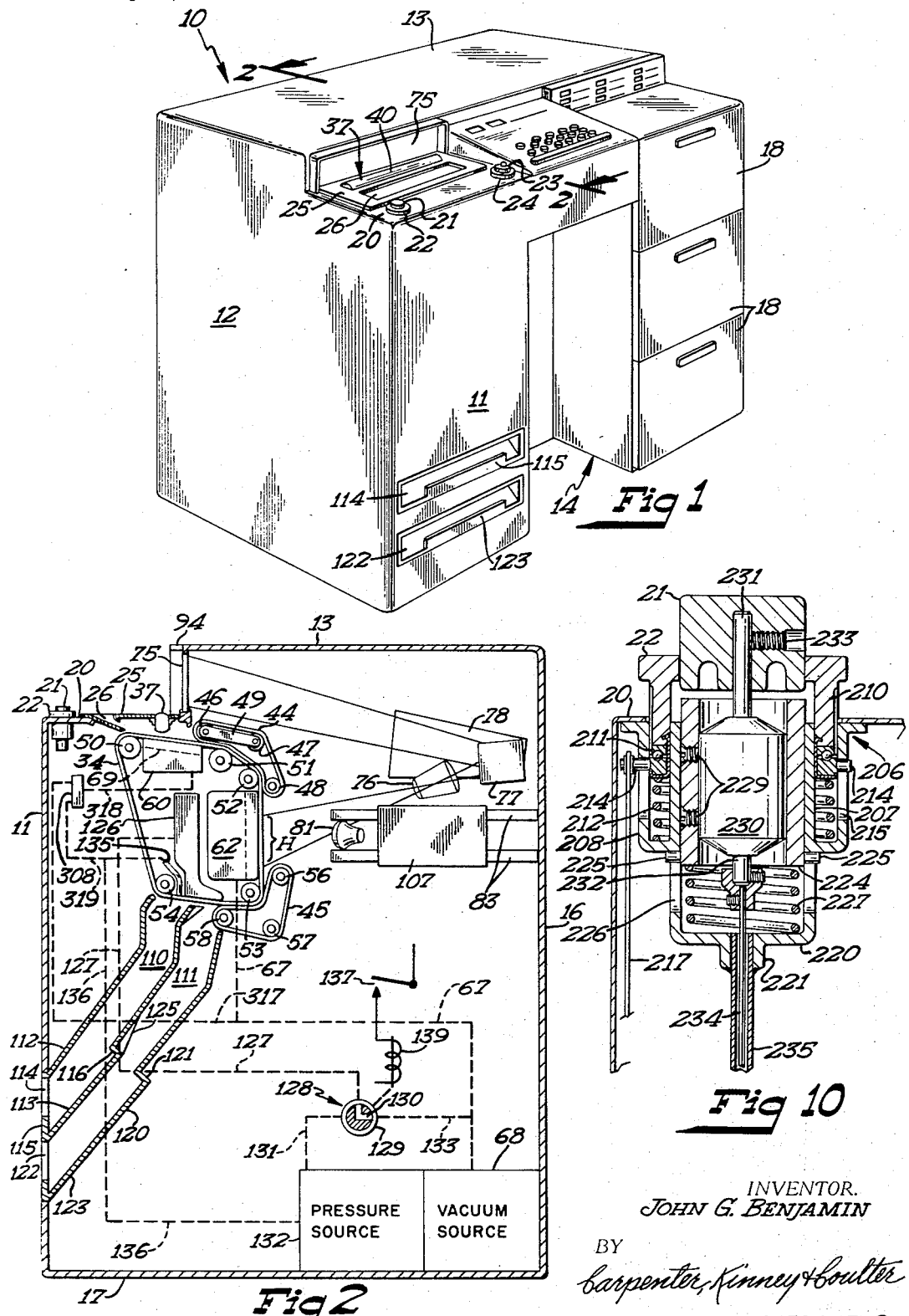
INVENTOR.
JOHN G. BENJAMIN
BY
Carpenter, Kinney & Coulter
ATTORNEYS

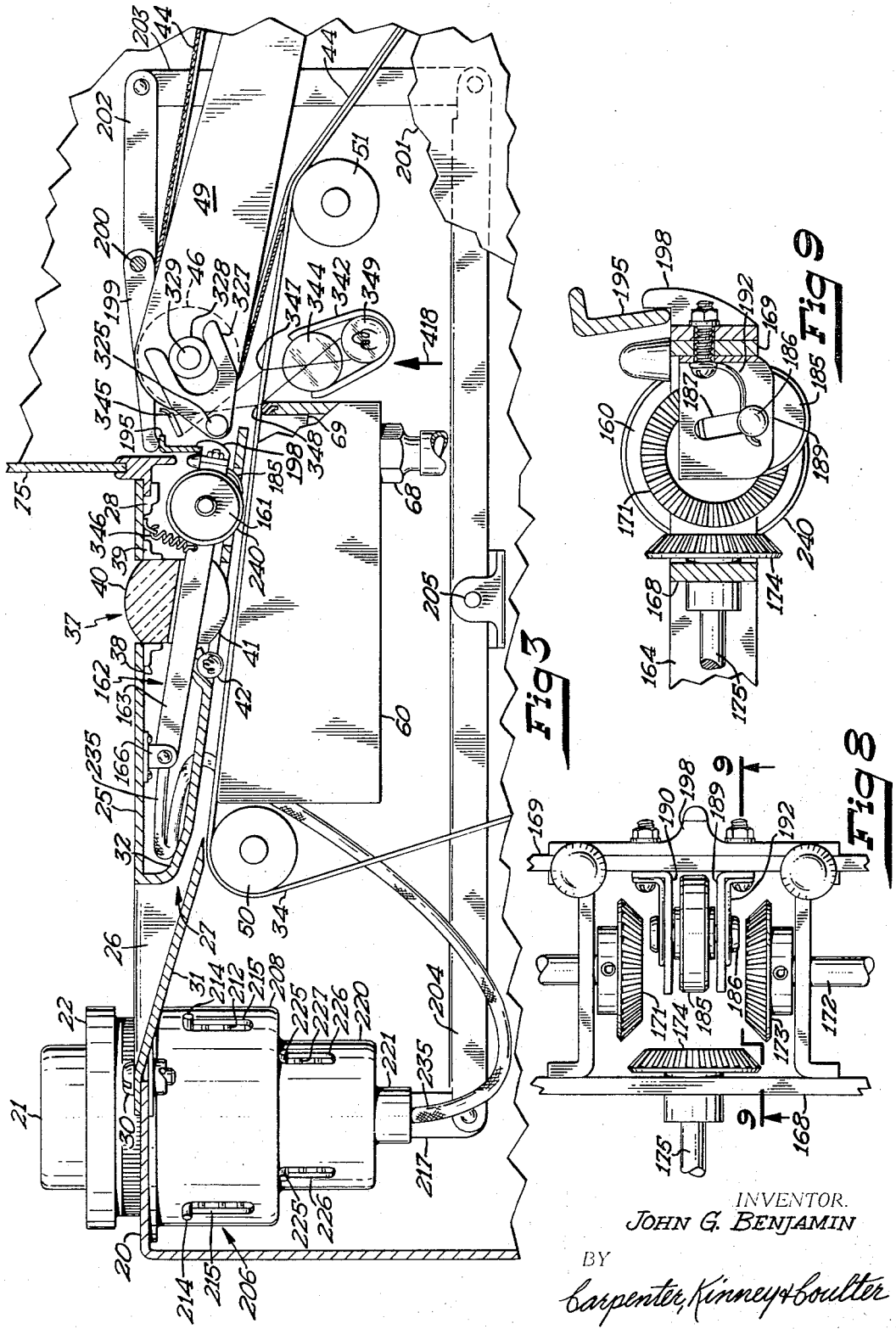

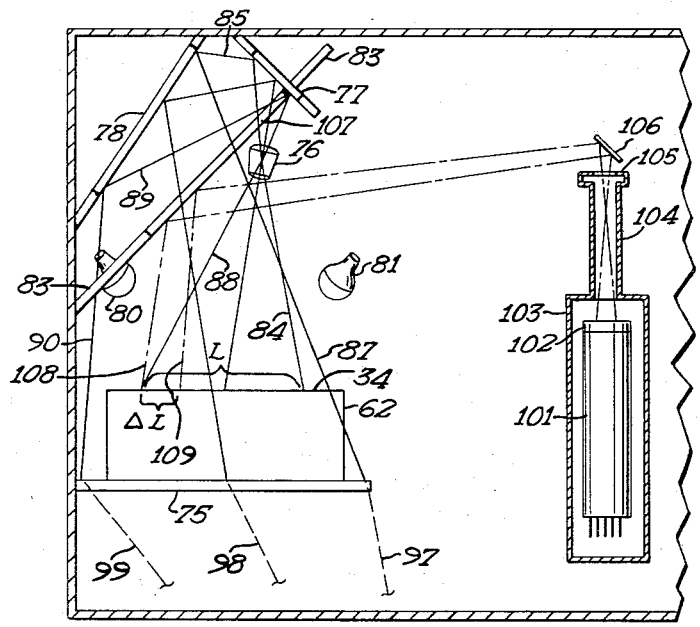
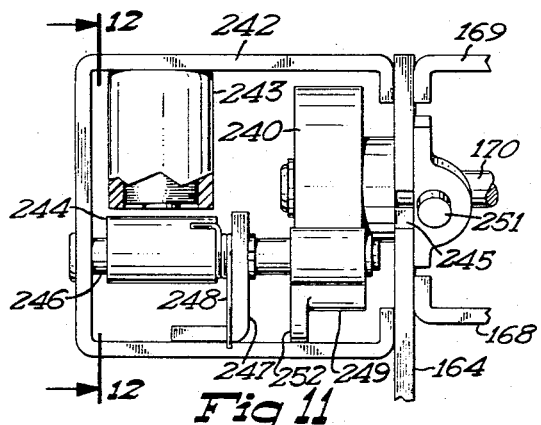
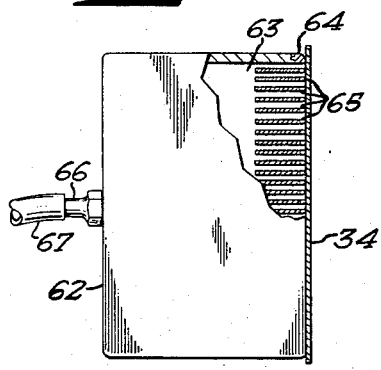
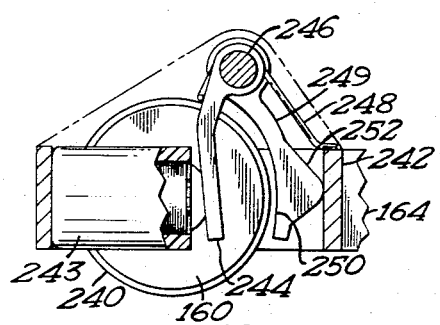
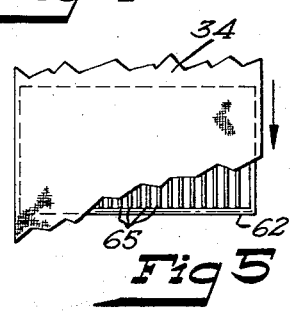

Dec. 19, 1967          J. G. BENJAMIN          3,358,554
FEEDING APPARATUS FOR SHEET MATERIAL
Filed May 28, 1965                        8 Sheets-Sheet 4
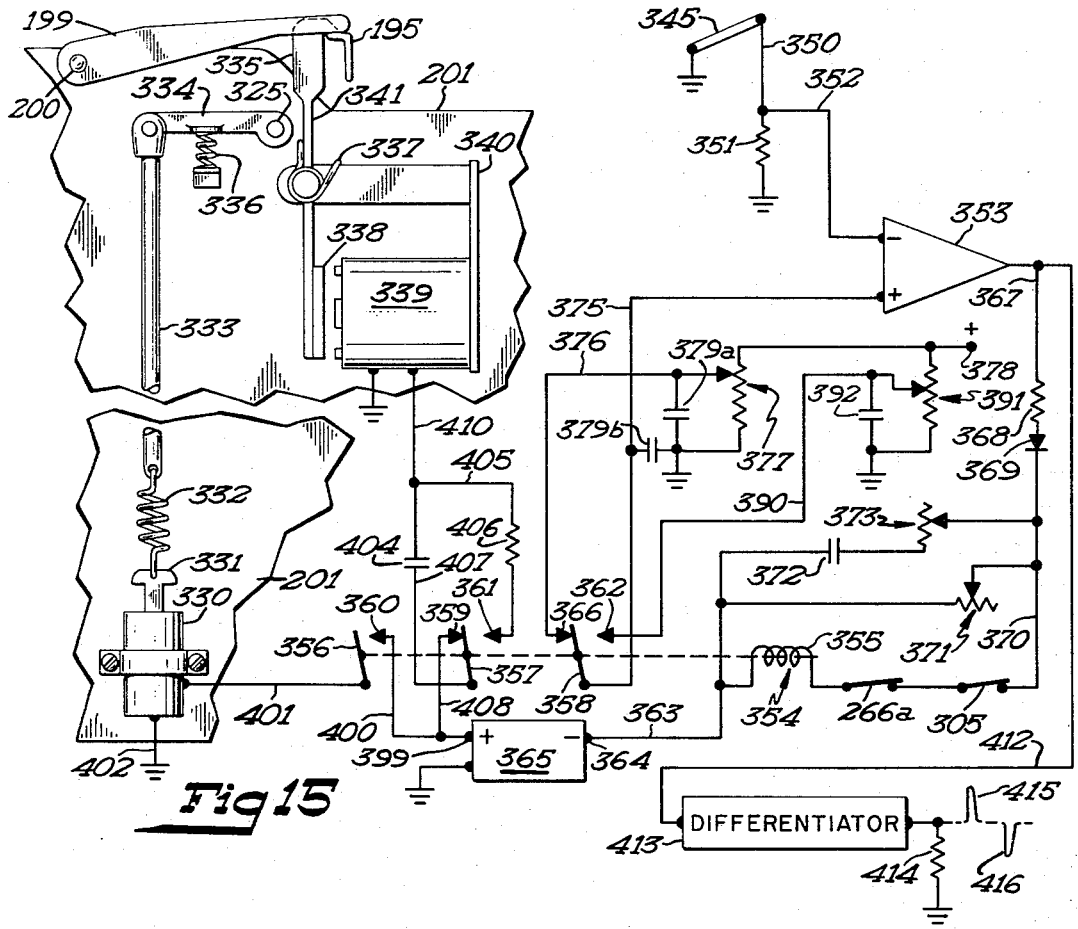
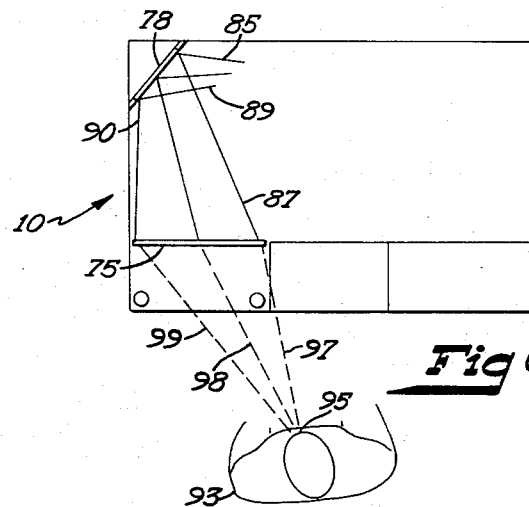
INVENTOR.
JOHN G. BENJAMIN
BY
Carpenter, Kinney & Coulter
ATTORNEYS

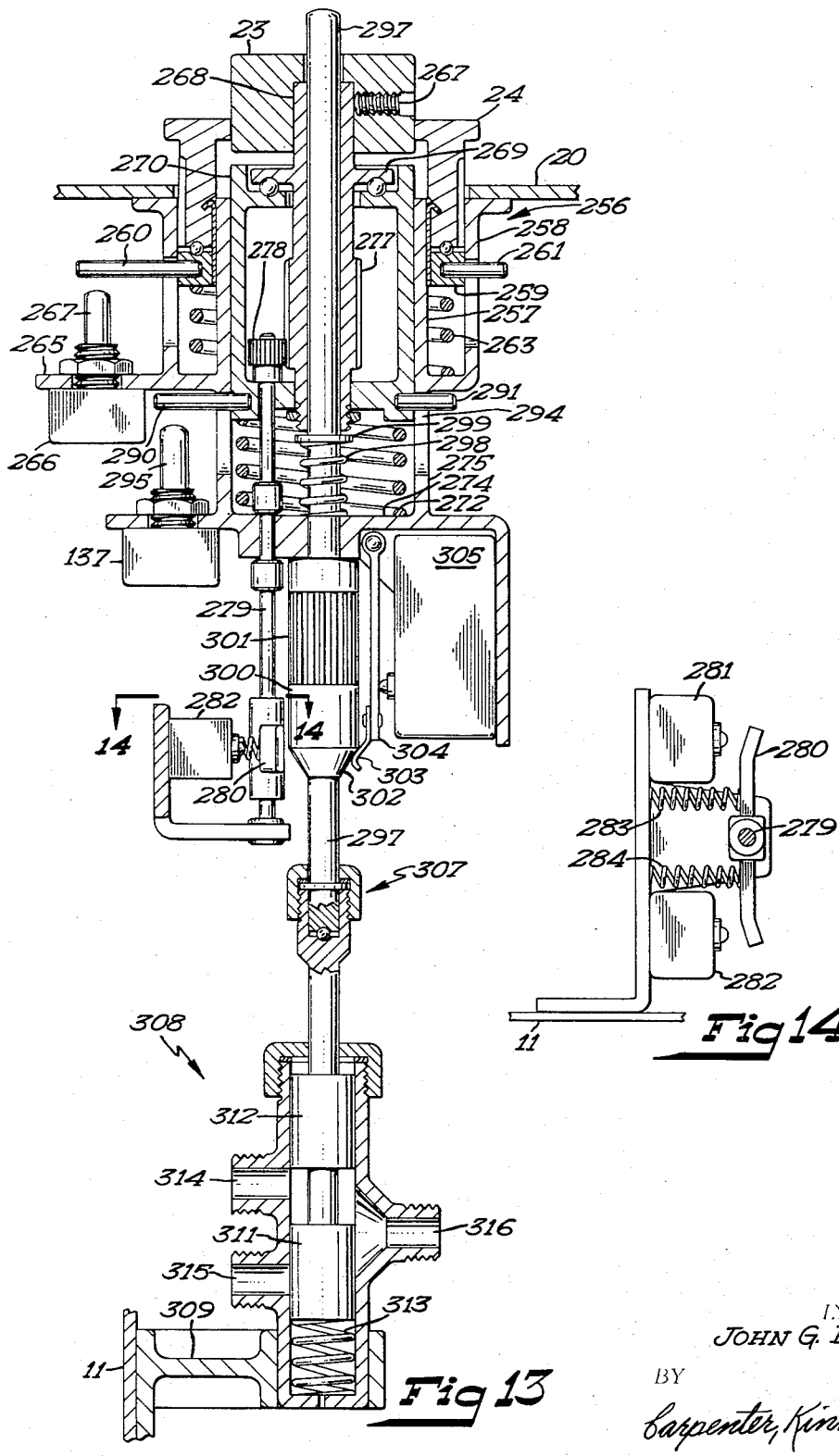

Dec. 19, 1967 J. G. BENJAMIN 3,358,554
FEEDING APPARATUS FOR SHEET MATERIAL
Filed May 28, 1965 8 Sheets-Sheet 7
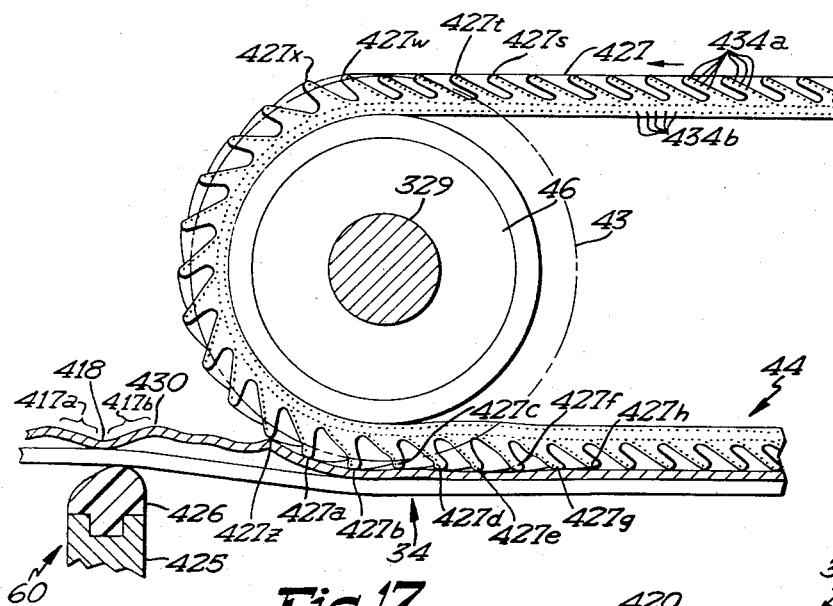
Fig 17
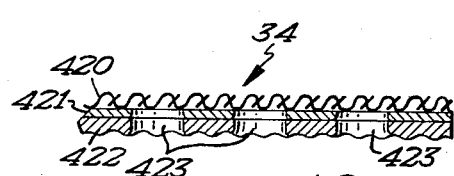
Fig 16
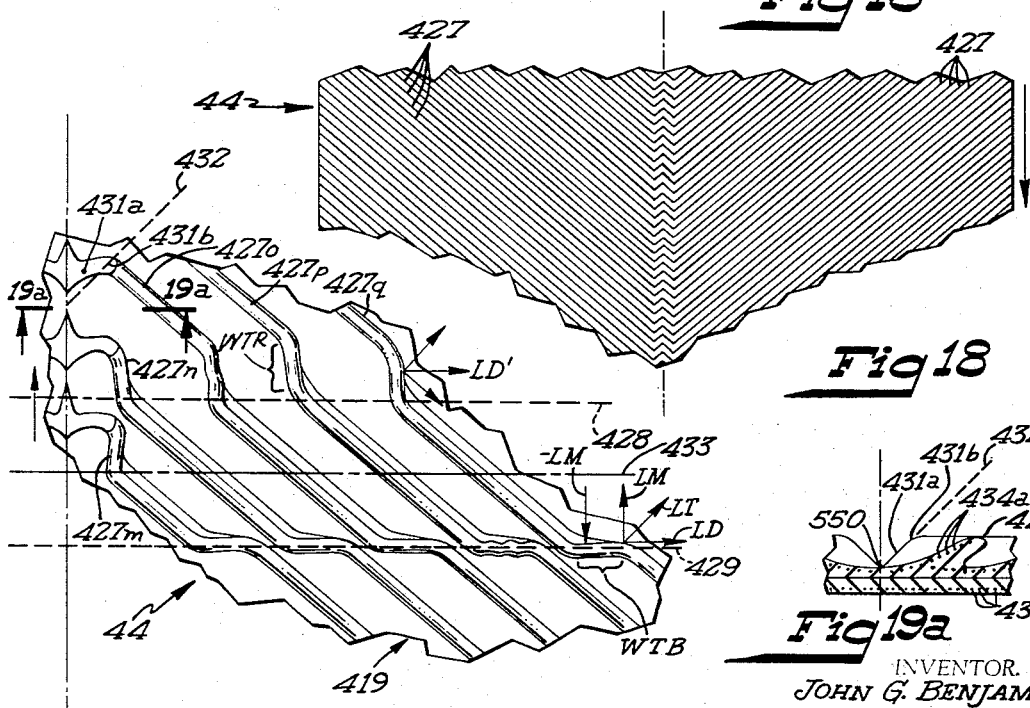
Fig 18
Fig 19
Fig 19a
INVENTOR.
JOHN G. BENJAMIN
BY
*Carpenter, Kinney & Coulter*
ATTORNEYS

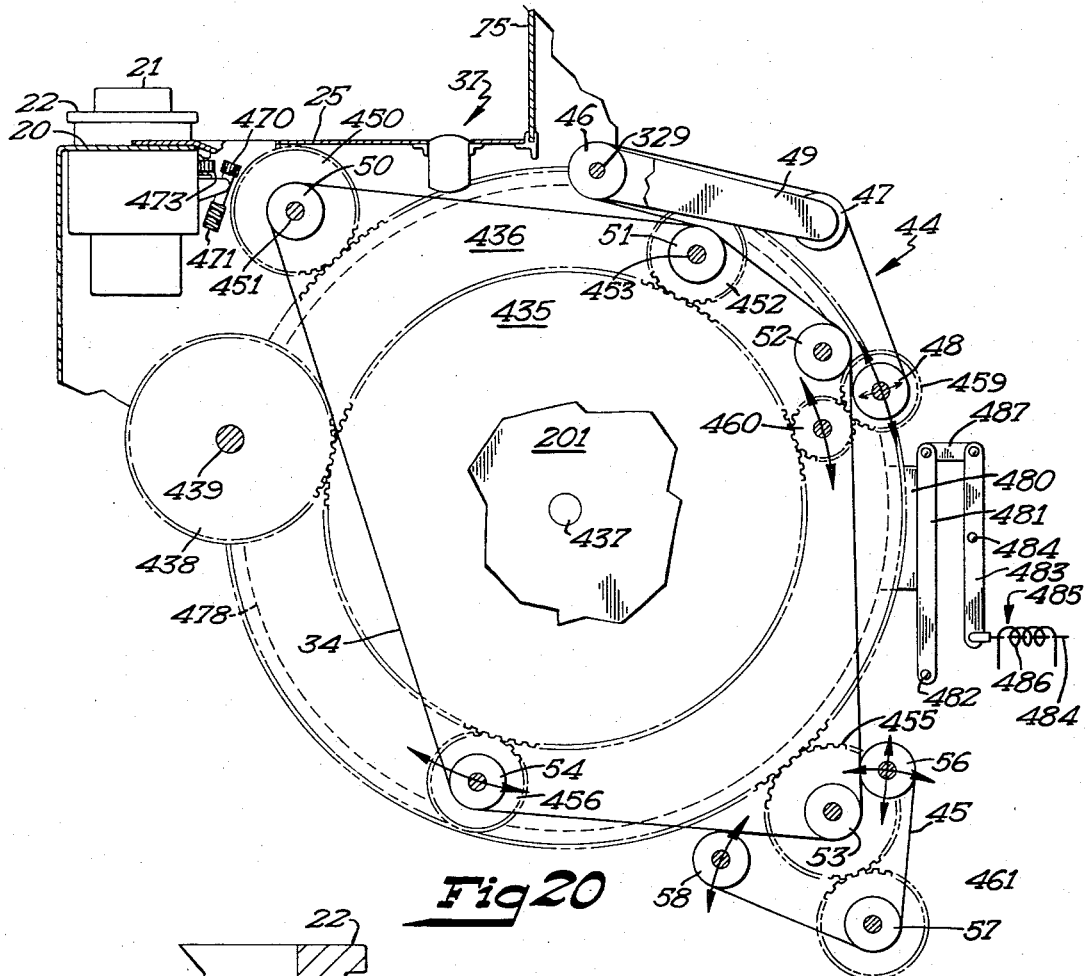
Fig 20
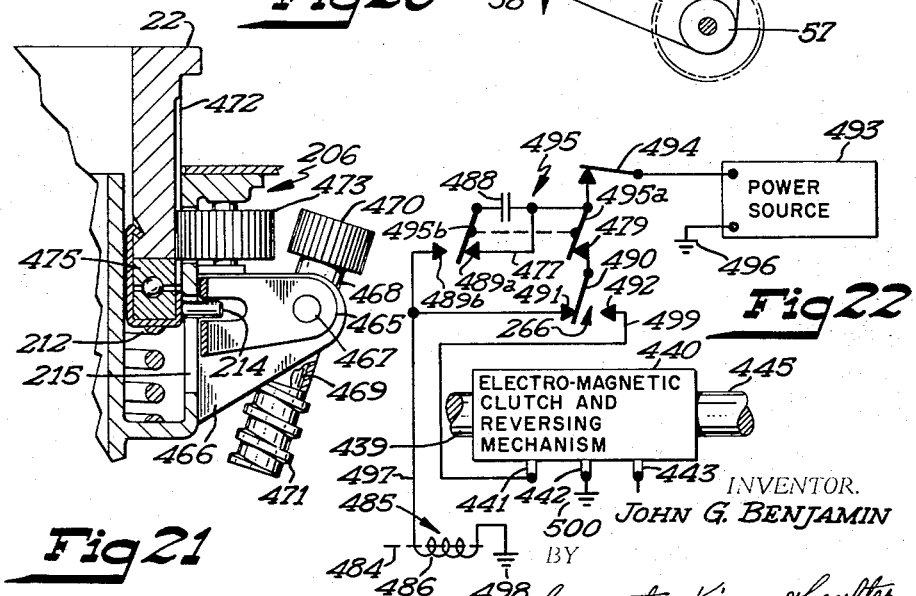
Fig 21
Fig 22
INVENTOR.
JOHN G. BENJAMIN
BY
Carpenter, Kinney & Coulter
ATTORNEYS

United States Patent Office 3,358,554
Patented Dec. 19, 1967

3,358,554
FEEDING APPARATUS FOR SHEET MATERIAL
John G. Benjamin, Minneapolis, Minn., assignor to Minnesota Mining and Manufacturing Company, St. Paul, Minn., a corporation of Delaware
Filed May 28, 1965, Ser. No. 459,695
24 Claims. (Cl. 88—24)

ABSTRACT OF THE DISCLOSURE

Feeding apparatus for transporting a sheet material having at least one row of indicia thereon past an elongated lens element having guide lines for visually indicating whether the row of indicia is parallel to the longitudinal axis of the lens element as shown. The apparatus includes means for selectively tiltably adjusting the alignment of a sheet material, means for removing wrinkles from the sheet material and means for projecting on a viewing screen the indicia being operated upon by means for responding to the indicia upon the sheet material.

The present invention is concerned with feeding apparatus for sheet material and more particularly with apparatus for feeding sheet material having intelligence thereon upon which an operation is performed as the sheet material passes through the apparatus.

One of the objects of the invention is to provide feeding apparatus for sheet material in which it is possible for an operator to quickly determine the size of a selected line of indicia on the sheet material as it enters the apparatus.

It is a further object of the present invention to provide such apparatus in which the operator can quickly check the alignment of such a selected row of indicia with respect to a predetermined guide line.

A still further object of the present invention is to provide such apparatus in which the wrinkling of the sheet material can be readily observed as the sheet material passes into the machine.

In accomplishing the foregoing objects, I provide a lens with suitable guide lines thereon to enable the size and alignment of a selected row of indicia to be readily observed in magnified form and such that any appreciable wrinkling of the sheet material is readily visible.

A further object of my invention is to provide means controlled from outside of the apparatus for tilting the sheet by very small amounts, this means also being effective both to guide the sheets and to aid in their dewrinkling.

In accomplishing the foregoing object, I employ a plurality of wheels which can be selectively placed in engagement with the sheet material or separated therefrom.

It is also an object of my invention to provide means for tilting the sheet material which is readily operable under the control of the operator even where the sheet material moves continuously.

A further object of my invention is to provide a sheet material feeding apparatus in which it is possible for the sheet material feeding means to be manually positioned for slight adjustments of the sheet material to bring a particular row of indicia into a desired position for viewing.

It is a further object of the present invention to provide a feeding means comprising a plurality of belts, the initial engaging portions of which are normally separated but are automatically brought into engagement upon the approach of the leading edge of the sheet material.

A further object of the invention is to provide such an arrangement in which such initially engaging portions of the belt are automatically separated as the sheet material leaves the area adjacent said portions.

A further object of the invention is to provide a belt construction for use in automatic feeding of sheet material in which the belt is suitably perforated to permit the transmission of air therethrough to control the engagement of the sheet material with the belt by a pressure differential across the sheet material, which may be on or adjacent to the belt's outer surface.

A still further object of the present invention is to subject the sheet material to successive flexing operations to produce fatigue in any wrinkles therein so as to facilitate substantial dewrinkling of the sheet material.

A further object of the present invention is to provide a novel form of belt in which the belt exerts a smoothing action upon the paper causing a smoothing effect like one attainable when human hands are used in attempting to remove wrinkles from sheet material.

A still further object of the invention is to provide means for maintaining the sheet material in viewing position where any intelligence thereon can be operated upon in a desired manner, such sheet being maintained in viewing position in such a manner as to be relatively free from wrinkles and without any holding means engaging the paper on the side to be viewed.

A further object of the invention is to provide a novel means for the operator to view a portion of the sheet material containing the intelligence while it is being operated on.

In connection with the foregoing object, it is an object to provide a viewing screen in which, even though the operator is disposed to one side of the center of the viewing screen, the intensity of the image observed by him is relatively uniform from one side to the other.

A still further object of the invention is to provide a means operating in conjunction with the means for driving the belts whereby the normal forward motion of said belts can be very quickly stopped at any time and can be selectively reversed.

A further object of the invention is to provide a sheet material feeding apparatus in which the sheet material leaving the apparatus normally enters one compartment but can be caused to enter another compartment where it was impossible to perform the desired operations on the sheet.

A further object of the present invention is to provide an arrangement in which the retention of the sheet material against or its release from a main carrier belt is accomplished by the selective use of air under vacuum or under pressure.

A further object of the invention is to provide an arrangement in which the driving belts are freed of lint or other foreign material.

A further object of the present invention is to provide a sheet material feeding mechanism in which a large number of functions are controlled from a relatively small number of manual actuators by selective manipulation of these actuators in various ways.

A still further object of the invention is to provide a sheet material feeding mechanism particularly adapted for use in a character recognition system where the characters to be recognized appear as indicia on the sheet material.

Other objects of the invention will be apparent from a consideration of the accompanying specification, claims and drawing in which:

FIGURE 1 is a perspective view of my apparatus for feeding sheet material, showing the exterior of the cabinet in which said apparatus is housed;

FIGURE 2 is a sectional view, partly schematic, taken along the line 2—2 of FIGURE 1 and looking in the direction of the arrows adjacent that line;

FIGURE 3 is a sectional view of a portion of the apparatus taken along the line 3—3 of FIGURE 7, with certain portions omitted for purposes of clarity;

FIGURE 4 is a top plan view of a box over which a belt carrying the sheet material is passed and which applies a vacuum to the sheet material through the belt as the sheet material moves thereover;

FIGURE 5 is a front elevational view of the same box showing a portion of the belt passing thereover broken away to show the vane construction of the box;

FIGURE 6 is a sectional view, somewhat schematic, taken immediately beneath the top cover of the cabinet and looking downwardly at a portion of the apparatus;

FIGURE 6a is a top plan view of the cabinet housing my apparatus showing the position of the operator when viewing the viewing screen thereof;

FIGURE 8 is a top plan view of a fragmentary portion of the apparatus for tiltably adjusting and guiding the sheet material as it passes therethrough;

FIGURE 9 is a sectional view taken along the line 9—9 of FIGURE 8;

FIGURE 10 is a sectional view of the left-hand knob assembly, the section being taken along the line 10—10 of FIGURE 7 so as to include two sectional planes displaced by 120 degrees;

FIGURE 11 is a showing of a portion of an arrangement for braking the tilting rollers where it is desired to tilt the sheet material while it is being continuously driven through the apparatus;

FIGURE 12 is a sectional view taken along the line 12—12 of FIGURE 11, with portions omitted for clarity;

Figure 7:
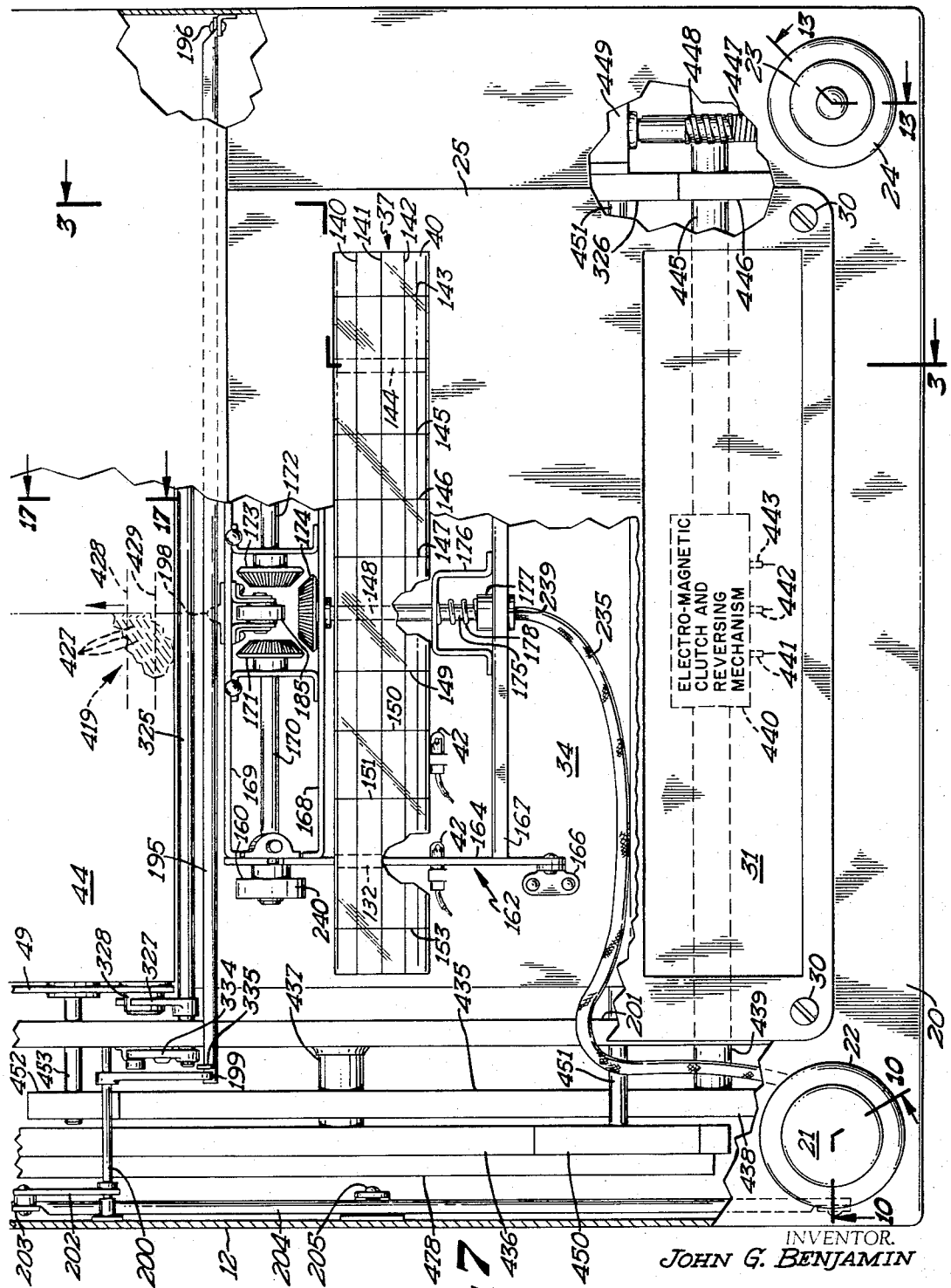
FIGURE 7 is a top plan view of a portion of the apparatus with a portion of the cabinet broken away to see some of the elements within the cabinet.

FIGURE 13 is a sectional view of the right-hand knob assembly, the section of the upper portion being taken along the line 13—13 of FIGURE 7 along two sectional planes displaced 120 degrees and the section of the lower portion thereof being taken along a straight sectional plane which would be indicated by continuation of the lower portion of line 13—13 of FIGURE 7;

FIGURE 14 is a section taken along the line 14—14 of FIGURE 13;

FIGURE 15 is a schematic view of the mechanism for shifting the belts and for retaining the tilting mechanism in depressed position and the electrical apparatus and circuitry for controlling the same;

FIGURE 16 is a sectional view of a portion of a first of the belts;

FIGURE 17 is a side elevational view showing the manner in which the sheet material is operated upon by the coaction of the first and second belts;

FIGURE 18 is a top plan view of the surface of a portion of the second belt;

FIGURE 19 is a view taken from underneath the sheet material, assuming the sheet material to be transparent and showing the effect of the engagement of the belt of FIGURES 17 and 18 with the sheet material;

FIGURE 19a is a transverse sectional view of a portion of the belt of FIGURES 17 and 18, adjacent the longitudinal center line thereof;

FIGURE 20 is a view partly in section looking toward the left-hand side of the cabinet as viewed in FIGURE 1 and showing the means for driving the various belts;

FIGURE 21 is a view partly in section showing the mechanism by which one of the knobs can be employed to manually move the belt driving mechanism; and FIGURE 22 is a schematic view showing the manner in which the electromagnetic clutch and reversing mechanism and the braking mechanism are controlled.

Referring first to FIGURE 1, I have shown my improved sheet material handling mechanism as part of a character reading apparatus for which the sheet material handling mechanism is particularly designed. The reference numeral 10 is employed to designate an overall cabinet having a front wall 11, a left side wall 12 and a top wall 13. Front wall 11 is provided with a recessed portion 14 which is designed to accommodate the legs and knees of an operator when he is seated in a chair in front of the apparatus. Cabinet 10 is also provided with a rear wall 16 and a bottom wall 17, both shown in FIGURE 2. On the right-hand side of the cabinet, the apparatus may have a plurality of drawers 18 for housing various portions of the equipment.

The top wall 13 is depressed at the front to provide a shelf portion 20. This shelf portion, as best shown in FIGURE 3, is provided on its left-hand side with a plurality of concentric knobs 21 and 22. These knobs, as will be explained in more detail later, are provided for the purpose of positioning and clamping the sheet material being fed through the mechanism. The shelf also has thereon knobs 23 and 24, which are used to control the feeding mechanism, as will be described later.

As also best shown in FIGURE 3, a substantial portion of the shelf portion 20 is cut away to provide an opening over which is fastened a plate 25 having an opening 26 and a throat portion 27 communicating with the opening 26. The plate 25, as shown in FIGURE 3, is provided on its underside near its rear edge with hooks 28 (only one of which is shown) which extend under a flange portion of a supporting member at the rearward extremity of the ledge. The plate 25 is fastened to the ledge 20 at its forward side by a plurality of quick releasable fastening means 30 of any suitable type.

The throat or passageway 27 is formed by a tubular extension of the plate 25. This tubular extension may be separately formed and secured to the plate so that it constitutes a single unitary assembly. The tubular extension constituting the throat 27 has a lower wall 31 and an upper wall 32. The lower wall 31 is relatively short, terminating adjacent to a belt 34. As will be explained in more detail, the tubular extension bounded by the two walls 31 and 32 provides an initial guide for sheet material inserted in the opening 26. The extension is accordingly of a width exceeding the width of the material to be handled by the apparatus.

An elongated lens element 37 is supported by a pair of bracket members 38 and 39 secured to the underside of the plate 25 as shown in FIGURE 3. This lens element has an upper curved surface 40 which may be viewed by an operator and a lower curved surface 41 which faces the sheet material passing through the apparatus. It will be noted that the curved surface 41 passes close to but slightly spaced from any sheet material carried by the belt 34. As will be explained in more detail, the lens 37 is employed for a variety of functions including that of determining whether the row or rows of indicia on the paper are tilted or are correctly lined up. The lens element also aids in determining not only the size but also the disposition of the indicia on the paper, and the extent to which the paper or other sheet material is wrinkled.

In order to illuminate the sheet material as it is passing beneath the lens 37, there are provided a plurality of light bulbs 42 which are shown in FIGURES 3 and 7. As best shown in FIGURE 3, these can be fastened in clips formed from upturning a portion of the upper wall 32 of the tubular extension 27 of the upper plate 25. As best shown in FIGURE 7, there will be a plurality of these bulbs 42 spaced across the entire width of the sheet material so as to uniformly illuminate the same as the sheet material passes beneath the lens 37. It is, of course, understood that the bulbs 42 will be connected to any suitable source of electricity, being energized whenever the apparatus is to be placed into operation.

Referring to FIGURE 2, it will be noted that in addition to belt 34, there are two other belts 44 and 45. Belt 44 passes over three rollers 46, 47 and 48. Roller 48 is driven by means to be described later. The belt 34 is disposed over rollers 50, 51, 52, 53 and 54, all but 52 of which are driven rollers.

The third belt 45 is disposed over rollers 56, 57 and 58, roller 57 being a driven roller. Belts 34 and 44 are of special construction which will be described later. Roller 46 is journaled on an axle carried by a pair of crossbars 49 which are journaled about the shaft on which roller 47 is journaled. As can be determined from a comparison of FIGURE 2 and FIGURE 3, the bars 49 are tiltable about the shaft of rollers 47 so as to carry the roller 46 between an uppermost position shown in FIGURE 3 to the position shown in FIGURE 2 in which the belt 44 is in clamping engagement with the sheet material being supplied to the apparatus. The means for moving the bar 49 from the position shown in FIGURE 3 to that shown in FIGURE 2 in which the belts are in clamping relation will be described later.

Referring back to the cabinet and particularly to FIGURES 1 and 2, it will be observed that any sheet material inserted in the opening 26 will be engaged between belts 34 and 44 when the bars 49 are tilted to the position shown in FIGURE 2 and that this material will be carried between the two belts. As will be discussed in more detail later, the belts are of such construction and so disposed with respect to the various rollers over which they are passed that this passage of the sheet material between the belts 34 and 44 not only transports the sheet material but also results in a significant smoothing of any wrinkles in the sheet material.

While the material is passing underneath the lens 37 and before being engaged by the belt 44, the material passes over a vacuum box 60 having a plurality of vanes 69 therein, as will be described presently. The belt 34 is apertured and when suction is present in box 60 the suction effect is transmitted through belt 34 to the sheet material lying on belt 34 to hold the sheet material firmly in engagement with the belt. This arrangement is particularly important where automatic feeding equipment is employed for introducing the sheet material. After leaving the belt 44, the paper overlies a portion of the belt 34 which passes over a second vacuum chamber 62. As best shown in FIGURES 4 and 5, this box 62 is provided therein with a plurality of vanes 65, which extend substantially into the interior chamber 63 of box 62 and whose outer extremities lie in the same plane as the outer edge walls of the box. As shown at 64 in FIGURE 4 in connection with the upper wall of the box, the outer extremity of the walls may be some material of very low coefficient of friction, such as the fluorocarbon plastics commonly known as Teflon and Kel-F. It is to be understood that the other wall edges of chamber 62 in contact with belt 34 are similarly provided with outer extremities formed of such low friction material. Each of the vanes 65 similarly has a low friction material applied at its outer edge. As will be noted from FIGURE 5, the belt 34 passes over the vacuum chamber 63 moving parallel to the vanes 65.

The vacuum box 62 is connected through a fitting 66 and any suitable conduit 67 (shown schematically in FIGURE 2) to a source 68 of vacuum. Vacuum chamber 60 may also be connected, as will be described later, to the vacuum source 68. It is to be understood that vacuum chamber 60 is formed similarly to chamber 62, having the edges engaging the belt 34 being coated with a low friction material. Similarly, the chamber 60, as indicated by the dotted line 69, has a series of vanes therein (similar to vanes 65 of box 62).

As was previously noted and as will be described in more detail, the belt 34 is formed with a plurality of openings therethrough. The low pressure present in box 62 can thus be applied through the belt 34 to act on any sheet material disposed thereon. The presence of the low pressure in box 62 not only allows the higher pressure exterior of the box to hold the sheet material in position on the belt 34 without any support but also enables the higher exterior pressure to hold the sheet material in a flat position relatively free of wrinkles.

While the sheet material being processed is disposed over the portion of belt 34 passing the face of the vacuum chamber 62 it is in the position in which it can be processed in the desired manner. The area being processed has a width L and a height H, as indicated by legends on FIGURES 2 and 6.

As pointed out above, my invention is particularly applicable to an arrangement in which indicia on the sheet material are automatically recognized by a suitable character recognition system. There are many types of such systems and for the purpose of this invention, any of several known types may be employed. It is to be understood, however, that is is equally possible that the intelligence present on this sheet may be photographed or that any of various other processes may be performed in connection with the sheet material while it overlies the vacuum chamber 62.

In order for the operator to properly monitor the passage of the sheet material and the operation of the equipment upon the material, I provide means for projecting onto a screen 75 the line and immediately adjacent lines of indicia on the printed sheet which is being operated on at any given moment. Referring to FIGURES 2 and 6, I have provided a lens 76 and a plurality of mirrors 77 and 78. The means for supporting the mirrors 77 and 78 are not shown in the drawing. It is to be understood that any suitable means can be employed for mounting these mirrors so that the reflecting surfaces are free and that no obstruction exists in the optical path. A pair of lamps 80 and 81 are shown, by way of example, as providing for the illumination of that portion of the indicia passing over the open face of the vacuum chamber 62 which is to be projected onto the screen 75. These lamps 80 and 81 can be supported in any suitable manner. In FIGURE 6, I have shown somewhat schematically the relationship between the screen 75 and the flat wholly exposed face of the belt 34 over vacuum box 62 within which region the information on the sheet material is viewed. Referring to the various optical ray lines shown therein, it will be noted that light from the right-hand side of the material being observed passes, as shown by ray line 84 through the lens 76 striking the mirror 77 closely adjacent the left-hand side of the reflecting surface. As shown by ray line 85, the same ray is reflected onto the right-hand portion of the reflecting surface of mirror 78 and is reflected from there, as shown by ray line 87, onto the right-hand side of the viewing surface 75. Similarly, as indicated by the ray lines 88, 89 and 90, the image rays from the left-hand side of the portion being viewed as it passes over chamber 62, are transmitted through lens 76 engaging the reflective surface 77 adjacent its right-hand edge, are reflected off of the left-hand edge of mirror 78 and are projected onto the viewing screen 75 to form an image at its left-hand side. It will furthermore be noted, from a comparison of the relative size of the original image region being viewed as it passes over the vacuum chamber 62 and of the image formed between rays 87 and 90 on screen 75, that the original material is enlarged as it appears on the screen 75. This enables the operator to read the indicia appearing thereon even though they are relatively small. In one particular example of my apparatus, I have employed a magnification of two to one so that the image appearing on the screen 75 is twice the size of the actual characters appearing on the sheet material being handled.

It will be noted from FIGURE 2 that a hood 94 projects slightly in front of the viewing screen 75 so as to tend to shade it from any exterior light. In some cases, however, the light in the room in which the equipment is located may be sufficiently intense or directed in such a direction that light may pass through the viewing screen and be reflected between the mirrors 78 and 77, and pass through the lens 76 back onto the material being handled. This is obviously undesirable, particularly if any particular image were transmitted back onto the indicia bearing material. It is possible to reduce this tendency in any of several ways. For example, it is possible to employ a semitransparent, front reflective coating on the inner surface of the glass. It is also possible to employ in front of screen 75 certain restricted transparency angle materials which transmit incident light only if it arrives within a certain cone of angular directions. By using the latter type of material, the amount of exterior light which passes through the screen can be materially limited.

It will be readily observed that the provision of the viewing screen 75 enables the operator to readily observe in enlarged fashion the portion of the material passing over the vacuum chamber 62 which is being scanned, photographed or otherwise handled. In case of any malfunction, the operator is able to observe the general area at which the malfunction occurs and to take manual corrective action if necessary.

The disposition of the mirrors 77 and 78 and the viewing screen 75 with respect to the front of the cabinet is such that the operator is supplied with a relatively uniform image brightness on the screen 75. This is best illustrated in FIGURE 6a in which the numeral 95 indicates the general location of the eyes of an operator 93 seated at the cabinet 10. As will be observed from a comparison of FIGURES 1 and 6a, the operator will be seated with his legs in the cut-out recessed area 14 so that his torso is centered or slightly to the left of center with respect to the cabinet. This would place his eyes in the approximate position indicated by the numeral 95. In FIGURE 6a, the dotted lines 97, 98 and 99 indicate the paths over which the image rays travel from the two edges and center of the viewing screen 75. The brightness of the image reaching the operator's eyes decreases with the amount of the angle between the direction at which the image ray reaches the screen 75 and the line between that point and the viewer's eyes. It will be noted, for example, that there is a relatively small angle between image ray 87 and image ray 97, the latter depicting the path through which the image ray must travel from the screen in reaching the viewer's eyes. Even in the case of the ray extending to the midpoint of screen 75 from mirror 78 and ray 98, there is not too pronounced an angle. It is true that the angle between rays 90 and 99 is somewhat greater. In general, however, due to the angular disposition of the mirror 78, the angles existing between rays 97, 98 and 99 and the corresponding rays extending to the mirror 78 are much less than would be the case, for example, if the system comprising mirrors 78 and 77 were arranged so that incoming rays from lens 76 struck screen 75 with image-center rays perpendicular to screen 75. Furthermore, reduction in intensity of the image which would tend to occur because of the greater angular distance between ray lines 90 and 99 is compensated by another opposing effect. The extent to which a lens, such as with any lenticular irregularity making up the image forming surface of viewing screen 75, transmits an image is dependent upon the angle at which an incoming ray strikes the lens element. It will be noted that ray line 90 extends at approximately 90 degrees with respect to the viewing screen 75. This is the angle for maximum transmission of light. The ray line 87 on the other hand, however, engages the viewing screen 75 at an angle which is substantially less than 90 degrees. Thus, the image increment transmitted over line 90 tends to be transmitted through screen 75 more effectively than the image increment transmitted over ray line 87. On the other hand, as explained above, there is more attenuation in reaching the viewer's eyes in the case of the image increment transmitted over image line 90 than that transmitted over ray line 87, due to the greater angle between lines 90 and 99. The two effects accordingly tend to compensate each other. Thus, the brightness with which the screen 75 is viewed is relatively uniform across the entire screen.

As mentioned above, one of the applications of my sheet material handling mechanism and the one for which it is particularly designed is that of character recognition. While the particular scanning mechanism forms no part of the invention of the present application and various scanning means may be employed, I have schematically shown in FIGURE 6 an arrangement for scanning the indicia on the sheet material as it rides on belt 34 over the face of the vacuum chamber. The numeral 101 is employed to identify a conventional vidicon camera. Of course, it will be understood that other image pickup devices such as the image orthicon, image dissector, iconoscope, photocell strip or matrix might also be used in various circumstances in place of the vidicon. A vidicon camera, such as shown for purposes of illustration, has a photosensitive target plate 102 upon which is produced a charge image that is scanned by an electron beam from a gun within the vidicon. The vidicon 101 is housed within a light-tight housing 103 having a lens barrel 104 with a front lens element 105. In converting an image to an electrical signal sequence by scanning, a vidicon camera tube gives better net resolution results if the area of the sheet material imaged on target plate 102 for subsequent scanning is relatively small. It is accordingly contemplated that at least one relatively small portion, ΔL of each line of indicia to be scanned will be imaged at any one time across 102 and either ΔL image on 102 will be shifted along the line as the scanning operation progresses or the entire line length L will be presented in ΔL segments with ends overlapping as two or more ΔL images "stacked" one above the other on the vidicon target 102. In order to accomplish this, I provide an optical arrangement schematically shown at 106. This arrangement, while shown as a single mirror, would actually be a composite lens, mirror and/or prism arrangement probably employing at least two movable or adjustable mirrors. This mirror arrangement 106 cooperates with a further mirror 107 which is supported within the cabinet by any suitable supporting means as designated by the numeral 83. As indicated in FIGURE 6, the ΔL portion being made available on plate 102 for scanning at any one time corresponds to the portion between image edge rays 108 and 109. These rays are reflected off of mirror 107, thence off from mirror 106, thence passing through lens 105 to form an image on the photosensitive target plate 102. It will be obvious that if the mirror 106 is rotated about an axis at right angles to the plane of the paper, the portion of the line between image edge rays 108 and 109 will gradually move along the line. Thus any ΔL portion of the entire line length L can be imaged on 102 for scanning. Also with additional mirrors and/or prisms at 106 and possibly at 107, additional ΔL portions of L can be simultaneously imaged on target plate 102.

Referring back to the movement of the sheet material through the apparatus and back to FIGURE 2, the sheet material will, as pointed out above, be pressure held to the belt 34 as it passes downwardly through viewing and scanning region H in front of the vacuum chamber 62, due to the vacuum in the chamber. As the sheet material passes below the chamber, it is engaged between belts 45 and 34, being once again held between two belts. Upon leaving belt 45, the sheet material is caused to pass into either one of two hoppers 110 and 111. The hopper 110 has an upper wall portion 112 which at its uppermost portion is bent slightly to the right to help deflect any sheets moving along the belt into the hopper 110. Below the uppermost deflector portion, the upper wall 112 drops almost vertically downwardly to enable the sheet to drop relatively freely after leaving the belt 34. Thereafter, the upper wall 112 slants on a diagonal, terminating at a slot 114 partially closed by a stop plate 115. The lower wall 113 of the hopper 110 extends generally parallel to the upper wall 112. At its upper end, like wall 112, it is provided with a sloping deflecting portion to facilitate the removal of sheets from the belt 34. Since this lower wall 113 constitutes the upper wall of the other hopper 111, the primary function of this deflecting portion is to deflect material into hopper 111 when this action is called for, as will be presently explained. The lower wall 113 is abruptly bent at 116 to cause the lower portion of the wall 113 to be offset downwardly with respect to the remaining portion. The purpose of this is to permit the sheets of material entering the hopper 110 to pile up and yet not interfere with the passage of additional sheets. The depth of the offset 116 determines the thickness of the pile of material that can be allowed to accumulate in hopper 110 before the pile has to be withdrawn through slot 114.

The hopper 111 is very similar to hopper 110 having a lower wall 120, the lowermost portion of which is offset at 121 with respect to the upper portion to allow sheet material to accumulate therein and not to impede the passage of further sheets onto the pile. The hopper 111 terminates at its lower end in an opening 122 which is partially closed by a stop plate 123. As explained previously, the extreme upper end of the wall 113 common to the hoppers 110 and 111 is bent to the right somewhat so that while papers are to be discharged into the hopper 111, the upper end of wall 113 tends to separate the material from the belt 34. It will be further noted that the wall 113, common to the two hoppers or passages 110 and 111, is provided with a diagonal deflecting plate 125 on the underside of the offset portion 116 so that any sheet material descending through the hopper 111 will not be stopped by the offset portion 113 but will move freely downwardly into the position where it is resting against the stop plate 123 adjacent the opening 122.

I employ means for determining whether the material being fed enters hopper 110 or 111. For this purpose, I provide a pressure box 126 which may be either maintained at a positive pressure or at a negative pressure with respect to ambient pressure. The edges of this box in contact with belt 34 may also have low friction material thereon, similar to edge 64 of box 62. Connected to this box is a suitable conduit 127 which leads to the outlet passage of a three-way valve 128. This valve may be of any of various types of three-way valves but is shown schematically as having a valve spool 129 with an L-shaped passage 130. The valve 128 is connected to two inlet conduits 131 leading to a positive pressure source 132 and conduit 133 leading to the negative pressure source 68 previously referred to. A solenoid actuator 139 is employed to rotate the valve spool 129. In the position shown, which is the normal position, the spool 129 is in a position in which the box 126 is connected through conduit 127, the L-shaped passage 130 and conduit 133 to the negative pressure source 68 so that a negative pressure is maintained in the box 126. The box 126 is provided with vanes or other means providing apertures in its lower face, as with box 62, so that the low pressure present in box 126 is applied through belt 34 (which, as previously explained, is perforated) to the bottom surface of any sheet material on belt 34 to cause the ambient pressure on the sheet material top surface to hold it in engagement with the belt 34 as the sheet material passes the upper end of the hopper wall member 113 dividing hoppers 110 and 111. Under these conditions, the material enters the hopper 110 which is the "good" paper hopper. In order to facilitate the separation of the paper or the sheet material from the belt 34, I have provided an elongated tube 135, the end of which constitutes a nozzle. This tube 135 is connected through a conduit 136 to the pressure source 132. The effect of tube 135 is to cause any paper passing the divider 113 between hoppers 110 and 111 to be deflected away from the belt 34 to enter the hopper 110.

Where it is desirable to reject certain sheets, means are provided for insuring that these sheets go down the reject hopper 111 so that the sheets which have been properly processed are in one hopper while those which have not been processed are in a different hopper.

Where the apparatus is used merely to feed one sheet through at a time, the solenoid valve 139 can be controlled directly through a manual switch, which is part of the knob 23 assembly. This switch is shown schematically in series with the winding of the solenoid 139 and designated by the reference numeral 137. The switch 137 may have a further automatically controlled switch in parallel therewith. As will be described later, I provide automatic means for sensing when a paper or sheet approaches the roller 46, this means being effective to lower roller 46 into the position shown in FIGURE 2. The same means may be employed for producing a signal indicative of the position on the belt of the sheet at that time. When it is determined automatically, such as by the scanning apparatus being unable to scan the material, this parallel switch will be closed momentarily. Regardless of whether the solenoid valve is manually or automatically controlled, the actuation of the valve 128 will be done in accordance with belt position and time so that the pressure will be applied to chamber 126 to eject the sheet into the reject hopper 111 at exactly the time that the leading edge of the sheet to be rejected is passing roller 58. Furthermore, the apparatus can automatically sense the trailing edge of the sheet and determine when the pressure should be removed from chamber 126 and the vacuum re-applied.

*Function of lens element 37*

In referring to the lens element 37, reference was made to determine whether the lines of indicia on the material passing therethrough were tilted or correctly lined up. As can be seen from FIGURE 7, the upper surface 40 of this lens has three parallel lines 140, 141 and 142 running longitudinally thereof for the full length of the upper surface. These lines are preferably scribed into the surface of the lens and filled with suitable coloring material. Similarly, there are a plurality of transverse lines 143 through 153. These lines, like the longitudinal lines, are scribed and filled with coloring material. The longitudinal lines 140, 141 and 142 have two primary functions. In the first place, they are employed to determine whether a typical line of indicia is tilted or not, thus giving an indication of whether the paper is properly placed into the machine for the particular line being viewed. It is fairly obvious that with the parallel scribed and colored lines 140, 141 and 142, any tilting of the line will be readily observable since the cylindrical lens greatly amplifies small tilt conditions, making it readily apparent that the line is not parallel to the guide lines. In addition, where the apparatus is employed for character recognition, some limitation must be placed upon the variation in size of the characters to be read, unless the apparatus is to be unduly complicated. Since the cylindrical lens also magnifies character height, the parallel lines 140, 141 and 142 may be used to determine easily whether the size of the indicia is within the allowable limits. For example, the equipment may be so arranged that any indicia which does not appear to extend from the bottom line 142 up to at least the middle line 141 when viewed at normal eye-to-lens 37 distance is too small to be read by the machine. Similarly, any character which extends from line 142 through line 140 is too large to be read by the machine. In other words, the machine can accept any characters which begin at line 142 and extend somewhere between lines 141 and 140.

The parallel lines 140, 141 and 142 are also very effective in detecting wrinkling of the sheet. If the sheet is wrinkled as it passes beneath the lens 37, a view through the cylindrical lens shows the effective height variation of character patterns in any line of indicia on a wrinkled portion to be much greater than that on a non-wrinkled portion. Also, the generally oblique lighting of a sheet's surface as provided by lights 42 will tend to accent wrinkle ridges and paper texture which show up as "background noise" during scanning; the cylindrical lens 37 further aids operator detection of these ridge and texture conditions by its magnification capability. Because of the parallel guide lines, this undue character height variation can be readily determined by an operator and if the thus discernible wrinkling is too excessive to be straightened out by the dewrinkling apparatus to be described, the sheet may be withdrawn before being allowed to pass through the apparatus on belt 34. It will be noted that lens 37 allows wrinkle judgment on the basis of actual pattern criteria which also affect the accuracy by which the indicia can be converted to electrical signals by scanning.

Where sheets are being fed automatically past lens 37, the parallel guide lines 140, 141 and 142 are particularly effective in detecting tilting. In this case, any tilting of the lines of indicia results in an apparent movement of the lines of indicia, when viewed through lens 37, much like that of a screw thread.

The transverse lines 143 through 153 similarly have a number of functions. In the first place, they give an indication of the length of any particular line. In some cases, for example, the lines 144 and 152 may be used to determine the maximum length of any line which can be processed. If any line extends beyond either of these two transverse lines, the operator will recognize that this particular line cannot be fully processed. The line 148 constitutes the center line and serves as a means for centering material. The distance between any two of the transverse lines may act as a unit of distance in connection with the scanning operation where scanning is employed. For example, a distance along L such as that existing between two of the transverse lines may be the length of a line segment sensed by a light sensor to obtain a measurement of the average character pattern density. In such a case, if there is a relatively short line, it is imperative that the sheet be positioned on belt 34 beneath lens 37 so that the line extends at least between any two adjacent transverse lines on lens 37; if it does not, the line could be defined as "too short" and the sheet containing that line could be removed and set aside.

Particular attention has been called to line 148 which acts as a center line and lines 144 and 152 which act as lines indicating the maximum overall length of a line which can be processed. Each of these lines is accentuated by reason of the fact that they are actually grooves cut through the lens at these line positions, these grooves also being for the purpose of permitting the passage of various elements as will be presently described. The use of grooves at these positions serves two purposes simultaneouly, first to accentuate these three very important lines, and second to allow passage of mechanical elements.

*Mechanism for controlling tilt and for engaging driving means*

When the operator observes that a typical line of indicia is tilted and the sheet is being introduced manually, he may initially correct this by simply grasping the sheet manually and tilting it until the line is correctly lined up with respect to the longitudinal guide lines 140, 141 and 142. It is always possible, however, that such manual alignment may be difficult or too inaccurate or that shifting of the sheet material may occur after the sheet is initially lined up and I accordingly provide further more precise means controllable from the outside of the cabinet to additionally correct such alignment. As best shown in FIGURES 3 and 7, I provide a plurality of rollers or wheels 160 and 161 (roller 160 being shown in FIGURE 7 and roller 161 being shown in FIGURE 3). These two rollers are journaled on a rectangular frame 162 consisting of two side bars 163 (FIGURE 3) and 164 (FIGURE 7). These two side bars are journaled to the underside of the plate 25 through brackets 166. The two side bars 163 and 164 are held together by longitudinally extending cross bars 167, 168 and 169, as best shown in FIGURE 7. The roller 160 is mounted upon a shaft 170 which is yieldably journaled in the side bar 164 and a further bar extending between bars 168 and 169. At the inner end of shaft 170 there is secured a bevel gear 171. The roller 161 (not shown in FIGURE 7) is similarly secured to a shaft 172 to which is secured at its inner end another bevel gear 173. Cooperating with bevel gears 171 and 173 is a third bevel gear 174 secured to a shaft 175 journaled in the longitudinal cross bar 168 and a bracket 176 secured to the cross bar 167. The axle 175 has a collar 177 secured thereto and a biasing spring 178 is interposed between this collar and the bracket 176. Biasing spring 178 is normally effective to bias the bevel gear 174 to the position shown.

As can be observed in FIGURE 3 in connection with the side bar 163, the two side bars 163 and 164 pass through slots cut into the underside of the lens 37. As pointed out previously, these slots actually form the guide lines 144 and 152 and the width of these slots serves to accentuate their importance as special transverse guide lines. Similarly, the axle 175 carrying the bevel gear 174 passes through a slot cut in the underside of the lens 37; this slot serves as a width-accentuated center line 148.

As will be presently explained, the rollers 160 and 161 are employed for varying the tilt of the paper. In addition, I provide a further roller to engage the paper's midpoint while the tilt correction action is taking place. The mounting of this third tilt correction roller is best shown by FIGURES 8 and 9. This third roller is designated by the reference numeral 185 and is secured on a shaft 186 which extends through slots 187 in opposed bracket members 189 and 190. As will be apparent from FIGURE 9, the shaft 186 is biased by means of springs 192 to its lowermost position in the slots 187, in which position, as best seen in FIGURE 9, the paper engaging surface of wheel 185 extends slightly below rollers 160 and 161. It will thus be obvious that shaft 186 is yieldably journaled in bracket members 189 and 190. Desirably, the axles 170 and 172 of rollers 160 and 161 are also yieldably journaled in the rectangular frame 162 in a manner similar to that in which axle 186 of roller 185 is yieldably journaled in bracket members 189 and 190.

The rectangular frame 162 is depressed by means of an inverted L-shaped bar 195, shown in section in FIGURE 3, which is pivoted, as shown in FIGURE 7, at 196 adjacent the right-hand side of the casing. The lower end of the upright portion of bar 195 engages a hook-shaped bracket 198 secured to the cross bar 169, as best shown in FIGURES 3, 8 and 9. It will be obvious that if the bar 195 is moved downwardly (as viewed in FIGURE 3) by rocking the left-hand end (as viewed in FIGURE 7) about the pivot point 196, the bar 195 will be effective to put downward pressure on the hook-shaped bracket 198 and tilt the entire rectangular frame 162 in a clockwise direction (as viewed in FIGURE 3) so that the rollers 160, 161 and 185 are lowered to the position shown in FIGURE 3 in which they engage any material passing beneath lens 37.

The means for depressing the left-hand end of lever 195 will now be described. This means includes a lever arm 199 journaled on a shaft 200 as best shown in FIGURES 3 and 7. The forward end of lever arm 199 engages the short leg of the inverted L-shaped bar 195. It will be obvious that (as viewed in FIGURE 3) counterclockwise movement of shaft 200 will cause the forward end of arm 199 to swing downwardly to force the bar 195 downwardly. The shaft 200 is journaled between a left side main bearing plate 201 (FIGURE 7) to which reference will be made from time to time and a suitable bracket secured to the outer wall 12 of the apparatus. This shaft 200 in turn has a lever arm 202 rigidly secured thereto. Connected in turn to the lever arm 202 is a link member 203 (FIGURE 3) which in turn is pivoted to the left-hand end of a lever member 204 journaled at 205 to a bracket secured to the side 12 of the housing. The left-hand or forward end of lever 204 is designed to be actuated by the depression of the outer knob 22. In order to understand how this action takes place, the knobs 21 and 22 will now be described in detail.

The construction of the assembly including knobs 21 and 22 is best shown in FIGURES 3 and 10. These two knobs are both supported in a cylindrical bracket 206 having spaced, concentric cylindrical walls 207 and 208 to form an annular channel therebetween, which channel is opened at its upper end and closed by a bottom wall. The knob 22 has a downwardly extending annular portion 210 which extends into the annular channel of bracket 206. This annular portion 210 has its lower end resting on a bearing ring 211 slidably disposed within the annular channel of bracket 208 and having its lower end resting upon a spring 212 seated on the bottom wall of the annular channel. The bearing ring 211 is a conventional two-part bearing ring having ball bearings disposed therebetween. The lower part of bearing ring 211 has a plurality of pins 214 spaced 120 degrees apart (only two of which are shown in FIGURES 3 and 10). As pointed out previously, FIGURE 10 is a sectional view taken along the line 10—10 of FIGURE 7 so that the view is taken along two sectional planes displaced 120°. Thus, the two pins 214 shown in FIGURE 10 are actually angularly spaced 120° even though they appear in FIGURE 10 to be opposite to each other. These pins 214 extend through vertically disposed slots 215 in the outer wall 208 of the bracket member 206. The pins 214 serve to guide the downward movement of knob 22 when it is depressed. The pins 214 have other functions also. The pin 214 shown on the left-hand side of FIGURE 10 is connected to a link 217 which, as shown in FIGURE 3, is connected to the left-hand end of lever bar 204. It will be obvious that the depression of knob 22 against the action of spring 212 causes the pins 214 to be forced downwardly. This in turn causes link 217 to be pushed downwardly, rotating the lever bar 204 in a counterclockwise direction (as viewed in FIGURE 3) to raise link 206 and to rock shaft 200 in a counterclockwise direction to depress the bar 195 and the pivoted rectangular frame 162 to the position shown in FIGURE 3. The frame when so moved is designed to be held in its depressed or tilted position shown in FIGURE 3 by an electromagnetically controlled catch to be described presently.

Continuing with the assembly consisting of knobs 21 and 22, the inner wall 207 of the bracket 206 encloses a cylindrical chamber which extends substantially below the outer wall 208 so as to be of substantially greater depth than the annular chamber bounded by walls 207 and 208. This inner cylindrical chamber is provided with a bottom wall 220 having a cylindrical apertured boss 221 extending downwardly from the center thereof. A cylindrical sleeve 224 is slidably mounted within the inner cylindrical chamber of bracket 206, being guided in this movement by a plurality of pins 225 spaced 120° apart and extending outwardly through vertical slots 226 (FIGURE 3) in the lower extended inner wall 207 of the bracket 206. A spring 227 is interposed between the lower portion of sleeve 224 and the bottom wall 220 of the bracket 206. Secured to the sleeve 224 as by screws 229 is a gear reduction box 230 having an upper input shaft 231 and a lower output shaft 232. The upper shaft 231 has the knob 21 secured thereto as by a set screw 233. The lower output shaft 232 is secured through a suitable coupling means to a flexible shaft 234 capable of transmitting both thrust and rotation. The shaft 234 is located in a flexible housing 235. As best shown in FIGURES 3 and 7, the flexible shaft 234 and its housing 235 extend from the location of knobs 21 and 22 past the main bearing plate 201 to where housing 235 is fastened to a connector member 239 through which the internal shaft 234 is operatively connected to the collar 177 of shaft 175 for transmitting both longitudinal and rotative movement to the shaft 175 and collar 177. The connector 239 is also designed to permit the ready disconnection of the shaft 235 from collar 177 and thus from the shaft 175, and also ready disconnection of housing 235 from connector member 239 and thus from bracket 167, for reasons to be referred to later.

It will be readily seen from FIGURE 10 that when knob 21 is depressed, the flexible shaft 234 is forced downwardly. This movement is transmitted by shaft 234 through the housing 235 to the shaft 175 against the biasing effect of spring 178 to force the bevel gear 174 into engagement with the bevel gears 171 and 173 connected respectively to shafts 170 and 172. If knob 21 is now rotated, this rotative movement of the shaft 234 will be transferred to shaft 175 to cause rotation of bevel gear 174. This will cause one of the two bevel gears 171 to move in one direction and the other to move in the opposite direction. As previously pointed out, bevel gear 171 is operatively connected to wheel 160 whereas bevel gear 173 is operatively connected to wheel 161. Thus, any rotation of knob 21 while it is depressed will cause equal and opposite rotation of the two wheels 160 and 161. As can be seen from FIGURE 3 in connection with wheel 161, the wheels are provided with rubber tires 240 having a relatively high amount of friction. Thus, any rotation of wheel 161 in one direction and wheel 160 in the other direction will cause rotation of the sheet. During such rotation, the sheet will pivot approximately about its engagement with the intermediate wheel 185 which remains stationary.

It will thus readily be seen that the sheet can be tilted one way or the other by manipulation of knob 21. This can be done while the operator is looking through the lens 37 and determining whether the particular line of indicia chosen for the purpose of properly aligning the sheet, is parallel to the lines 140–142. By the use of lens 37 and by the manipulation of knob 21, in the manner above described, the selected line of material can be quickly aligned. As soon as the alignment is completed, knob 21 is released. The knob 21, the reduction gear assembly 230 and the sleeve 224 are all moved upwardly by the action of biasing spring 227 to return the cable 234 to its original position. This permits the spring 178 (FIGURE 7) to move shaft 175 to the position shown in which the bevel gear 174 is disengaged from bevel gear 171 and 173. Rollers 160 and 161 are now free to rotate by reason of the motion thereunder of belt 34 together with any sheet material belt 34 may carry on its outer surface without exerting any tilting effect upon the sheet material.

In the above description, it has been assumed that the rectangular frame 162 was initially in its uppermost position and that the sheet was manually aligned before using the rollers 160, 161. It may be desirable, however, with an experienced operator, to leave the frame 162 in the position shown in FIGURE 3, even when the sheet material is being fed manually. Under these conditions, a suitable vacuum is maintained in chamber 60 so that the higher external pressure will act to hold the sheet material against belt 34 with appropriate force. Thus, movement of belt 34 will carry the sheet material beneath the rollers 160 and 161 even though they are in the lowered position. Under these conditions, the tilting can be done very quickly by momentarily braking one or the other of the two rollers 160 and 161 in such a way that the sheet material is frictionally held at one side by the tire 240 on the wheel being braked, while belt 34 slips underneath the held edge of the sheet material, and the opposite edge of the sheet material is carried forward toward roller 51 by the motion of belt 34.

In FIGURES 11 and 12, I have shown a desirable braking arrangement which can be employed, this braking arrangement being illustrated in connection with roller 160. Secured to the side bar 164 of frame 162 is a U-shaped frame member 242. Secured to this U-shaped frame member 242 is an electromagnet 243 having concentric pole pieces cooperating with an armature 244 pivotally journaled on a shaft 246. The shaft 246 is supported in the frame member 242 at one end and in a bracket member 247 carried by the frame member. A biasing spring 248 surrounds the shaft 246 and biases the armature 244 away from the pole pieces of magnet 243. The shaft 246 to which armature 244 is secured, also has secured thereto a braking member 249. This braking member has a braking surface 250 adapted by its curvature and position with respect to wheel 160 to engage the surface of the wheel 160 properly regardless of the position of the wheel. Shifting of the wheel takes place because of the fact that as was shown in connection with wheel 185, and as was mentioned earlier, the axle supporting wheels 160 and 161 are preferably yieldably mounted in the same manner as the center wheel 185. While the details of this mounting are not essential to the invention, I have shown, in connection with FIGURE 11, a slot 245 in which the axle 170 carrying wheel 160 slides. A spring housed within a bore covered by a closure member 251 bears against the axle 170 and holds it in its innermost position. When the wheel 160 is pressed against sheet material on belt 34 due to the tiltable frame 162 being lowered, however, the wheel and axle 170 are able to yield somewhat against the action of the biasing spring, thus providing for a certain amount of "press-back." This spring beneath closure 251 thus acts in a manner similar to the spring 192 of FIGURE 9.

Going back to the effect of the braking member, the braking surface 250 is effective, both to exert a decided braking effect on wheel 160 and to exert a forward (as shown in FIGURE 12) and slightly downward thrust upon the wheel 160 when the braking surface is moved into engagement with the wheel. The braking member 249 has projecting therefrom a heel portion 252 which extends in the opposite direction from the braking surface 250 and is designed to engage the interior wall of bracket member 242 when the eletromagnet is disengaged. The projecting length of heel 252 is adjusted to space the braking surface 250 at a minimum distance from the surface of tire 240 so that wheel 160 is free to turn whenever electromagnet 243 is not energized so that braking surface 250 is moved as quickly as possible to braking position against tire 240 after electromagnet 243 is energized. When the electromagnet is energized, the armature 244 is drawn into engagement with electromagnet 243, simultaneously drawing the braking surface 250 into engagement with the wheel. In addition to frictional braking of wheel 160, some force from electromagnet 243 is applied through surface 250 and wheel 160 to cause shaft 170 to move forward (toward member 169) and slightly downward (toward belt 34) by reactions with slot 245 in member 164. Since shaft 170 is normally guided in slot 245 to direct the force of the biasing spring under closure 251 so that wheel 160 snugly presses against any sheet material carried on belt 34, this additional force, applied via the same vectorial direction (parallel to the sides of slot "T") as that from the biasing spring because of slot 245 reactions, causes wheel 160 to be even more snugly pressed against the sheet material. Thus, activation of electromagnet 243 not only applies braking friction to tire 240 on wheel 160 but also increases the frictional forces between the sheet material and tire 240 so that there is maximum positive control of the sheet material on belt 34 via the braking mechanism. It will be understood that a similar braking member is provided in connection with wheel 161. As will be presently explained, the selective energization of the electromagnet 243 or the corresponding electromagnet associated with roller 161 is controlled by a pair of switches controlled by knob 23.

The construction of knobs 23 and 24 is best shown in FIGURE 13. As shown in that figure, the knobs 23 and 24 are mounted concentrically on the shelf 20 in a manner very similar to that in which knobs 21 and 22 are mounted. The various elements of the knob assembly are supported by a cylindrical bracket member 256 similar in certain respects to bracket member 206 associated with knobs 21 and 22. This bracket member, like bracket member 206, is secured to the underside of panel 20 and has two concentric annular walls, namely an inner cylindrical wall 257 and an outer cylindrcal wall 258 spaced to provide an annular passage therebetween. The ring 24 constituting the outer knob slidably extends into this annular passage and engages a bearing ring 259, suitable bearings being disposed therebetween. Extending from the bearing ring 259 are three pins 260, 261 and a pin not shown in the drawing. As previously mentioned, the upper portion of FIGURE 13 is sectioned so that there are two sectional planes spaced 120° apart; thus it would appear that pins 260 and 261 are diametrically opposed. Actually these pins are spaced 120° apart. Interposed between the bearing ring 259 and the lower wall of the annular chamber bounded by walls 257 and 258 is a spring 263. The supporting bracket 256 is provided with a side extension 265 which supports a switch 266 having an operating plunger 267 lying in the path of pin 260. The switch 266 is of the type in which the switch is moved to successively different positions upon successive actuation of the plunger 267. The switch 266 may include a single pole, single throw switch and also a single pole, double throw switch. When the plunger is actuated once, it is moved to one of its two circuit controlling positions; the next time the plunger is actuated, the switch moves to its other circuit controlling position, etc. It will be obvious that whenever ring 24 is depressed, the pin 260 engages the plunger 267 to change the position of the switch element of switch 266. The switch 266 is employed as the main switch for starting and stopping of the apparatus including the application of driving power to the various gear driven rollers for moving and guiding belts 34, 44 and 45.

The knob 23 is shown as a hollow knob and is secured as by a set screw 267 to a sleeve 268 having a flange 269 supported by ball bearings on a further flanged sleeve 270. This further sleeve 270 is located within the cylindrical chamber within the inner wall 257 of bracket 256 and is supported vertically by a spring 272 interposed between the lower end of the sleeve 270 and the bottom wall 274 of the cylindrical chamber formed by a cylindrical extension 275 of the inner wall 257 of bracket 256. The sleeve 268 is provided at 277 with elongated gear teeth 277 which engage with a spur gear 278 secured to the upper end of a shaft 279 which is journaled in both the lower wall 274 of the chamber previously referred to and in the lower wall of sleeve 270. The shaft 279 is held in proper vertical position by setscrew held sleeves on opposite sides of the wall 274 and also is operatively connected to a bar 280, secured at its midpoint to the shaft 279. The opposite ends of bar 280 are adapted to selectively engage the operating buttons of two precision snap switches 281 and 282 (FIGURE 14). The bar 280 is biased to its mid-position as shown in the drawing by two springs 283 and 284. When knob 23 is rotated in either direction, the rotation of the knob is imparted to sleeve 268, which through the coupling between the elongated gear teeth 277 and the spur gear 278, causes rotation of bar 280 in one direction or the other to engage the operating button of either switch 281 or 282. The switches 281 and 282 are used to control the energization of the electromagnets associated with the braking mechanism for rollers 160 and 161. It will be obvious that if switch 281, for example, is connected to one of the braking electromagnets in series with a suitable source of power and knob 23 is turned clockwise, arm 280 will press the button of switch 281 and close its contacts; thus, the electromagnet is energized to brake the particular roller with which it is associated. Thus, through actuation of knob 23, the switches 281 and 282 provide a means whereby one or the other of the brakes associated with the two rollers 160 or 161 can be rendered effective as long as the knob 23 is rotated from its normal position. The elongated teeth 277 are necessary because, as will be presently pointed out, the knob 23 is depressed for certain functions and when this is done, it is desirous that there still be a driving connection maintained between the sleeve 268 coupled to knob 23 and the shaft 279 positioning the bar 280.

Where the brakes associated with rollers 160 and 161 are provided for controlling the tilting of the paper, it is also possible, particularly in connection with automatic feed, to have the rollers 160 and 161 continuously driven. This would be done by driving the shafts 170 and 172 through a differential mechanism. Under these conditions, when the brake associated with roller 160 or roller 161 is energized, the rotative movement being imparted to the rollers through the differential causes the rotation speed of the unbraked roller to increase, thus causing a more rapid tilting action on the sheet material. This permits continuous movement of the sheet material through the apparatus with provision for quickly changing the tilt of any particular line of indicia.

The sleeve 270 is provided with a plurality of projecting pins 290, 291 and a third pin not shown in FIGURE 13. These pins project through slots 294 in the cylindrical extension 275 of the inner wall 257 of bracket 256. It will be obvious that the pins 290 and 291 prevent rotation of sleeve 270. When sleeve 270 is depressed, by reason of the depression of knob 23, pin 290 is adapted to engage plunger 295 of the switch 137, previously referred to. The switch 137 is of the type which is momentarily engaged when plunger 295 is depressed. The switch 137 is employed to control the pressure supplied to the pressure chamber 126, as was previously described.

Extending through the knob 23 and the sleeve 268 is a cylindrical push rod 297 which is spring biased to the position shown in FIGURE 13 by a spring 298 located between the bottom wall 274 and a flange 299 carried by the push rod 297. The push rod 297 carries an elongated collar 300 having elongated teeth 301 and a conical lower extremity surface 302. The teeth 301 are provided for a driving connection with apparatus not forming part of the present invention. The conical lower end 302 is adapted to engage with a leaf spring 303 secured to an actuating arm 304 of a switch 305. Since the section of the lower portion beginning with bottom wall 274 in FIGURE 13 is along a single plane, rather than two planes 120° apart as is the upper section, switch 305 is opposite to shaft 279. Switch 305 is of the precision snap type and is adapted to control the energization of the electromagnet controlling the release of the tiltable frame 162 as will be presently described. When rod 297 is depressed downwardly, snap switch 305 is moved by surface 302 acting through spring 303 and arm 304 to a position in which the contacts thereof are maintained separated as long as rod 297 is depressed.

The rod 297 is connected at its lower ends through a rotary joint 307 to a valve assembly 308. This lower portion of FIGURE 13, beginning with joint 307, is taken along a straight sectional plane parallel to side wall 12. The valve assembly is carried by a bracket 309 secured to the front wall 11 of the cabinet. The valve 308 is a relatively conventional three-way valve type having a pair of valve spools 311 and 312 biased to the position shown in FIGURE 13 by valve spring 313. The casing of valve 308 is provided with an inlet 314 adapted to be connected to a vacuum source 68 and inlet 315 adapted to be connected to the pressure source 132 and an outlet 316 connected to the pressure chamber 60. When the valve is in the position shown, a lower than ambient pressure is applied from the negative pressure source through conduits 67 and 317, valve 308, conduit 318 and fitting 68 to the vacuum chamber 69. When it is desired to release the sheet for any reason such as the need to withdraw the sheet, the rod 297 is depressed to move the valve spools 311 and 312 downwardly so that a passage exists between the pressure inlet 315, the area between the two valve spools 311 and 312 and the outlet 316. Under these conditions, a reasonably higher than ambient pressure is applied from the pressure source through conduits 136, 319, valve 308, conduit 318 and fitting 68 to the vacuum chamber 69. With higher than ambient pressure applied through the porosity openings of belt 34 beneath it, the sheet is no longer retained against the belt 34 and tends to be blown away therefrom. At the same time, the switch 305 is momentarily closed to energize the electromagnet which controlled the latch for the frame 162. As will be explained in connection with FIGURE 15, this latch is effective when released by the energization of the electromagnet to permit the frame 162 to move upwardly and release the rollers 160, 161 and 185 from engagement with the sheet material. If desired, the inlet 315 may be connected to the atmosphere instead of to pressure source 132. When this is done, depression of button 297 merely results in the lower than ambient pressure being removed from the chamber 60 so that the sheet material can be readily manipulated or withdrawn.

It will be readily apparent from the above description that the knobs 23, 24 and the push rod 297 operate to control a large number of functions in connection with the control of the mechanism for feeding the sheet material through the apparatus.

The means for latching the tiltable frame 162 in a depressed position and for swinging the bars 49, and thus the roller 46 they carry, into the depressed position of FIGURE 2 will now be described. Referring first to FIGURES 3 and 7, it will be noted that a shaft 325 is journaled in the left-hand main bearing plate 201 and a corresponding plate 326 on the right-hand side of the belt 34 as in FIGURE 7. This bearing plate has secured thereto at each of its ends a yoke member 327 best shown in FIGURE 3. Each of these yoke members is adapted to control its respective roller-carrying bar 49 by engaging a collar member 328 which is fastened to and projects from the outer surface of its associated bar 49. Each collar member 328 forms a journal for one end of the shaft 329 on which roller 46 is carried. It will be obvious that clockwise rotation of shaft 325 as viewed in FIGURE 3 will cause the shaft 329 carrying the roller 46 to be lowered until it assumes the position shown in FIGURE 2.

The rotation of shaft 325 is accomplished through an electromagnet 330 (FIGURE 15) secured to the left-hand side (as viewed in FIGURE 7) of the left-hand main bearing plate 201. This electromagnet is secured to the bearing plate close to the lower edge thereof so as to be free of the various gears used in the mechanism for driving the rollers. The bearing plate is shown in FIGURE 15 with a portion thereof broken away. The electromagnet is provided with a movable armature 331 adapted to be drawn downwardly upon energization of the magnet. This is coupled through a spring 332 with a link 333 secured to an arm 334 fastened to the shaft 325 on the left-hand side of bearing plate 201. The arm 334 is normally biased to the position shown in FIGURE 15 which corresponds to the position in which the elements are shown in FIGURE 3, by a spring 336 interposed between the arm 334 and some suitable bracket secured to the bearing plate 201. It will be obvious that upon energization of the electromagnet 330, the armature 331, in being drawn downwardly, causes counterclockwise rotation of arm 334 (as viewed in FIGURE 15). This in turn will cause clockwise movement of shaft 325 as it is viewed in FIGURE 3, FIGURE 15 being a view from the left-hand side of the cabinet and FIGURE 3 a view from the right-hand side. The rotation of shaft 325, as mentioned above, will cause the yoke members 327 to rotate in a clockwise direction (as viewed in FIGURE 3) to bring the roller 46 into the position shown in FIGURE 2 in which the belt 44 is brought into engagement with the belt 34.

Mounted on the same side of plate 201 is a mechanism for holding the tiltable bar 195 and consequently the frame 162 in its depressed position. A spring biased catch 335 is adapted to extend over the short horizontal leg of bar 195, as best shown in FIGURES 7 and 15. This catch 335 is secured to a lever 341, being biased by a spring 337 into a latching position shown in FIGURE 15. The lower portion of lever 341 carries an armature 338 which is adapted to cooperate with an electromagnet 339 secured on a frame 340 which in turn is secured to the main bearing plate 201. It will be obvious that when the electromagnet 339 is energized, the armature 338 is drawn to the right causing the latch member 335 to disengage from the bar 195. Under these conditions, a biasing spring 346 extending between the tiltable bars 163 and 164 and the cover member 25 (as shown in FIGURE 3) is effective to move the frame in a counterclockwise direction to the point at which rollers 160, 161 and 185 are released from the sheet material on belt 34 or belt 34 itself.

The electrical circuit connections for controlling the energization of magnets 330 and 339 will now be described. Referring first to FIGURE 3, it will be noted that I have provided a light source 349 mounted in a reflector 342. It will be understood that the light source 349 is relatively long and extends substantially the full width of the sheet material. The same is true of the reflector 342. In the outer portion of the reflector 342 is a cylindrical lens 344. As has been mentioned previously and as will be described in more detail later, the belt 34 is provided with a plurality of apertures therethrough or, in some embodiments, belt 34 may be fabricated of materials which make it translucent, as will be presently described. Thus some of the light passing from bulb 349 and through lens 344 onto the under surface of the belt 34 is able to pass therethrough. Mounted between the two yoke members 327 and extending substantially the full width of the belt 34 is a light sensitive photosensitive element 345. A typical cell that is suitable is a selenium voltaic cell of the B-17 type made by the International Rectifier Corporation. It will be noted from FIGURE 3 that even though shaft 325 lies between the light source 349 and the light sensitive cell 345, the light sensitive cell is subjected to illumination for the full width thereof. This is also true despite the presence of the righthand wall of chamber 60 adjacent a portion of the lens 344. It will be seen that the effect of the light 349 and the lens 344 is to illuminate a narrow strip on the underside of belt 34 with sufficient intensity so that the amount of light emerging from the top surface of belt 34 above this strip is sufficient to reliably actuate photosensitive element 345. This illuminated strip extends substantially the full width of belt 34 and at least between that width represented by the distance between transverse lines 152 and 144 of lens 37 in FIGURE 7 and the width of the strip extends substantially between points 347 and 348 on FIGURE 3. The light coming through belt 34 at point 347, as can be seen from the depicted light path, is able to illuminate the extreme left-hand edge of the light sensitive element 345. Similarly, despite the presence of shaft 325 the light at point 348 is able to illuminate the right-hand edge of the light sensitive element 345. Thus, despite the presence of shaft 325, the light sensitive element 345 is adequately illuminated for the control purposes to be described momentarily. It will also be noted that when the roller 46 is lowered, the roller will intercept that part of this light coming from the strip region adjacent to point 347 so as to diminish the illumination of the cell. I have provided means for compensating for this which will be described in connection with FIGURE 15.

Referring to FIGURE 15, it will be noted that one terminal of cell 345 is grounded and the opposite terminal thereof is connected through a conductor 350 with the upper terminal of a resistor 351, the lower terminal of which is grounded. Thus the photovoltaic voltage output of cell 345 is applied across resistor 351. This voltage is applied through conductor 352 to one of the two input terminals of a differential operational amplifier 353. This amplifier is of the type which has two input voltages applied thereto and produces an output voltage which is dependent in the polarity of its output upon which of the two inputs is greater. The amplifier is of a type with a very high gain and the output of which changes from its negative saturation voltage to its positive saturation voltage, depending upon whether the input voltage from the cell 345 is above or below the reference voltage applied to the other input terminal. A voltage is applied to the other input terminal and this voltage is controlled by a relay 354, the energization of which is controlled by amplifier 353. Relay 354 comprises a relay coil 355, a plurality of movable contact members 356, 357, and 358, and a plurality of fixed contact members 359, 360, 362, and 366. The movable contacts are biased to a position in which the contact member 357 is in engagement with fixed contact member 359 and movable contact member 358 is in engagement with fixed contact member 366. The movable contact members are movable upon energization of winding 355 to a position in which the movable contact members 356, 357 and 358 are in contact making engagement with fixed contacts 360, 361 and 362, respectively. The left-hand terminal of relay coil 355 is connected through a conductor 363 to the negative terminal 364 of a power supply 365. The negative terminal 364 is at a negative potential corresponding to the negative saturation output potential of amplifier 353. The output of amplifier 353 is connected through a conductor 367, a resistor 368, a diode 369, a conductor 370, the switch 305 referred to in connection with FIGURE 13 and switch 266a, one of the two switches of main switch 266, to the right-hand terminal of relay coil 355. It will be obvious that when the output of amplifier 353 is at its negative saturation value, which is the condition existing when the photosensitive cell 345 is fully illuminated, the right-hand end of the relay coil will be maintained at the same potential as the left-hand end which is connected to the negative terminal 364 of power supply 365, and the relay will be deenergized. When, however, the illumination of photocell 345 is substantially diminished by the passage of sheet material as it is positioned or carried on belt 34 between cell 345 and the light rays coming through belt 34 from light 349 so that the voltage output from the cells load resistor 351 applied to the upper, inverting input terminal of amplifier 353 decreases to, say, a few millivolts (the amount being dependent upon the particular type of amplifier 353 used) less than the reference comparison voltage supplied to the non-inverting input terminal of amplifier 353 plus the particular differential offset voltage of the particular amplifier 353 used, the amplifier output voltage will be switched rapidly to its positive saturation value and a positive voltage will immediately be applied across relay coil 355 with respect to terminal 364 of power supply 365, through conductor 367, resistor 368, diode 369, conductor 370, and closed switches 266a and 305. Connected in parallel with series connected relay coil 355 and switches 266a and 305 is a variable resistor 371 for adjustment of the delay in de-energization of the relay 354. Also connected in parallel with series connected relay 354 and switches 266a and 305 is the series combination of a capacitor 372 and a variable resistor 373 for adjusting the delay in energization of relay 354. The resistor 373 also acts to prevent the capacitor 372 from initially shunting the relay winding 355 by completely bypassing the high frequency voltage change which occurs when the output of the amplifier changes from near its negative saturation voltage condition to near its positive saturation voltage condition. Instead, when this amplifier output change does occur, the speed with which relay coil 355 becomes effectively energized can be varied slightly, depending on the resistance value set in variable resistor 373 and the capacitive value of capacitor 372. Thus, if the resistance of variable resistor 371 is about one to two times the resistance of coil 355 and variable resistor 373 is about one-fifth or less of the resistance of the variable resistor 371, it will be evident that the resistance of resistor 368 can be chosen so as to limit the maximum voltage between wire 370 and wire 363 (during the first moments after amplifier 353 switches to near positive saturation) to a magnitude which is less than the voltage required to supply minimum energizing current to coil 355 of relay 354, and that the amount of time amplifier 353 must be near positive saturation output voltage before relay 354 is actuated is adjustable by the setting of variable resistor 373. It may be seen that undue chattering of relay 354 is also prevented by capacitor 372 and resistor 373 during times when the voltage across load resistor 351 may fluctuate above and below the comparison voltage when the amplifier is first switched by comparison voltage relationships. Maintenance of amplifier 353 at near positive saturation output voltage will result in the exponential charging of capacitor 372 until it assumes a voltage thereacross substantially equivalent to that existing across relay coil 355.

When the movable relay contact 358 is in the position shown in FIGURE 15, that is the position assumed when relay 354 is de-energized, the non-inverting input terminal of amplifier 353 is connected through a conductor 375, movable contact 358, stationary contact 366, and conductor 376 to the slider of a potentiometer 377 connected between a positive source of voltage 378 and ground. Connected between the slider of potentiometer 377 and ground is a capacitor 379a which assumes a reference comparison voltage thereacross dependent upon the position of the slider.

When relay 354 is energized, the non-inverting input terminal of amplifier 353 is connected through conductor 375, movable contact 358, fixed contact 362 and conductor 390 to the slider of a potentiometer 391 connected between the positive source of voltage 378 and ground. A capacitor 392 is connected between the slider of potentiometer 391 and ground. A capacitor 379b, connected between conductor 375 and ground, prevents the input terminal from assuming noncontrolled, spurious potential levels while movable contact 358 is transferring from a connection with contact 366 to a connection with contact 362 or vice versa.

Consequently, a lower level of illumination of cell 345 is required (when relay 354 is closed) to cause the voltage developed across resistor 351 to exceed the comparison voltage applied to the non-inverting differential input plus the particular offset voltage involved and thus to cause amplifier 353 to switch toward negative saturation so that relay 354 can de-energize.

It will be noted from a comparison of potentiometers 377 and 391 that the slider of potentiometer 377 is shown as set at a more positive reference comparison voltage than that of potentiometer 391. Thus, when relay 354 is de-energized, the lower, non-inverting input terminal of amplifier 353 is maintained at a more positive potential than when it is energized. The feature of changing the comparison voltage applied to the non-inverting terminal of amplifier 353 is provided to compensate for the reduction in maximum light level reaching the light sensitive cell 345 when the roller 46 is holding belt 44 against belt 34, as mentioned above.

The relay 354 is employed to control the energization of both the solenoid 330 and the electromagnet 339. When relay 354 is energized, the engagement of the movable contact 356 with fixed contact 360 results in a circuit being established to solenoid 330 as follows: from the positive terminal 399 of the power supply 365, through conductor 400, fixed contact 360, movable contact 356, conductor 401, relay coil 330 and conductor 402 to ground. The energization of this solenoid, as previously explained, will cause arm 334 to be rotated in a counterclockwise direction (as viewed in FIGURE 15). This, in turn, will cause a clockwise rotation of shaft 325 as viewed in FIGURE 3 to cause the roller 46 to be moved downwardly against belt 34. It is to be understood that the spring 332 may be adjustable in any suitable manner to provide a desired amount of pressure of belt 44 against belt 34.

During the time that relay 354 is energized, the electromagnet 339 is maintained de-energized. A capacitor 404 in series with the winding of electromagnet 339 is maintained de-energized by a circuit extending from the upper terminal of capacitor 404 through conductor 405, a current limiting resistor 406, fixed relay contact 361, movable contact 357 and conductor 407 connecting to the lower terminal of capacitor 404. When, however, relay 354 becomes de-energized so that movable contact 357 engages fixed contact 358, an energizing circuit is established for electromagnet 339 from the positive terminal 399 through conductor 408, fixed contact 359, movable contact 357, conductor 407, capacitor 404 and conductor 410, and electromagnet 339 to ground. Since capacitor 404 is completely discharged because of the connection previously traced in contact 361 of the relay, a large initial flow of current can take place through this capacitor and through the coil of electromagnet 339. This will result in the armature 338 being attracted to release the latch 335 from the bar 195. This will permit the bar to move upwardly under the influence of spring 341 and permit the release of rollers 160, 161 and 185 from the sheet material. The capacitor 404 is provided to prevent continued energization of the electromagnet 339 since only a momentary energization is necessary to release the latch 335. As soon as the condenser 404 begins to charge, the current through the winding of electromagnet 339 will decrease until the point is reached where it is effectively de-energized. This is particularly important when the apparatus is initially started up since the relay 354 will be in its de-energized position and it is not desired to maintain the electromagnet 339 energized so as to prevent the latch 335 from being effective. By the use of the capacitor 404, the start-up energization of the electromagnet 339 is only momentary.

In actual practice, the arrangement employing the light 349, the light sensitive cell 345, the amplifier 353 and the relay 354 is used to respond to the insertion of a paper or other sheet material into the slot 26. As long as the paper merely lies beneath the lens 37 and the rollers 160 and 161, the light sensitive cell remains illuminated and the relay 354 remains de-energized. When, however, the leading edge of the sheet reaches a point immediately underlying the roller 46, it interrupts the passage of light through lamp 349 to the light sensitive cell 345 with the result that the decreased current output of the light sensitive cell causes the voltage across resistor 351 to drop below the comparison input voltage to amplifier 353 to cause the operation of relay 354 if the main switch 266 is in its "on" position in which its switch 266a is closed. When the trailing edge of the sheet leaves the area just to the right of point 348 and the light sensitive cell 345, the passage of light coming through belt 34 from lamp 349 to cell 345 is again no longer interrupted by the sheet material. This causes amplifier 353 to switch back to negative saturation, thus de-energizing the coupling relay coil 355 and its associated time delay components by back-biasing diode 369 so that the de-energization delay time cycle can begin for relay 354. As pointed out above, the output of cell 345 is less when roller 46 is holding belt 44 against belt 34 as in FIGURE 2 than it is when roller 46 is holding belt 44 away from belt 34 as in FIGURE 3, due to the fact that belt 44 on roller 46 is partially blocking the passage of the light rays coming through belt 34 from light 349 to the cell 345. This, however, is compensated for by the means previously described as involving resistors 377 and 391, which provide that the comparison voltage applied to the non-inverting input terminal of amplifier 353 when relay 354 is energized is less than that applied for comparison when relay 354 is de-energized. Thus compensation for the reduction in maximum intensity of illumination of the light sensitive cell 345 is automatic.

In addition to its use in combination with variable resistor 373 to cause a slight delay in the actuation of relay 354 as discussed previously, the capacitor 372 has the additional function of supplying current to delay the de-energization of relay 354. This is desirable since when the trailing edge of the sheet leaves the area between points 347 and 348, it still has a substantial distance to travel before passing over the roller 51. Consequently, it is desirable for the roller 46 to remain depressed for a short period of time after the trailing edge leaves the area between the light source 341 and the photocell 345 during which time the motion of belt 34 can carry the trailing edge of the sheet material to about the region above roller 51 as viewed in FIGURE 1. As previously pointed out, the capacitor 372 becomes charged to the voltage existing across relay coil 355. Capacitor 372 has a sufficiently high capacitance so that, following the de-energization of relay 354 by reason of the output terminal voltage of amplifier 353 becoming the same as that at terminal 364 of the power supply, the relay 355 will remain energized due to the flow of some of the discharge current from capacitor 372 through resistance 373 and relay coil 355. Another portion of this discharge current flows through variable resistor 371, thus bypassing the relay coil 355. So it is obvious that the discharge time of capacitor 372 and consequently the de-energization delay time afforded relay 354 can be increased or decreased by respectively increasing or decreasing the resistance value of variable resistor 371. This provides time for the sheet material to progress onwardly until substantially the entire sheet has passed over the roller 51.

The output from amplifier 353 can also be used to provide various signals indicative of the position of the sheet in the machine. It will be noted that the output of amplifier 353 is connected through conductor 412 to the input of a differentiator 413 having an output resistor 414 connected across the output thereof. As previously explained, during switching the output of amplifier 353 changes abruptly from a negative voltage equivalent to that of terminal 364 of power supply 365 to a suitably higher, more positive voltage and vice versa. Of course, differentiation of the output wave form of amplifier 353 produces a positive voltage pulse each time the output of the amplifier is abruptly increased and a negaitve voltage pulse each time the output is abruptly decreased. The numerals 415 and 416 are used to denote positive and negative pulses respectively, these pulses being indicative of the passage of the leading and trailing edges of the sheet material beneath the light sensitive cell 345. It is obvious that these pulses may be used for controlling various operations in connection with the sheet handling apparatus, particularly when processing such as scanning is to take place whenever sheet material is present or not present in the H region on belt 34, as shown in FIGURE 2, between roller 48 and roller 56.

It will be noted that switch 305 referred to in connection with FIGURE 13 is in series with the relay coil 354. If the roller 46 is depressed so that the belt 44 is in engagement with belt 34, as shown in FIGURE 3, the opening of switch 305 by reason of the pushing down of push rod 297 will de-energize relay coil 354 to cause momentary energization of the electromagnet 339 to release the catch 335 and the tilt wheel carriage 162. It will also cause de-energization of solenoid 330 to release arm 334 to permit the rollers to move up to the position shown in FIGURE 3. As previously explained, the movement of rod 297 downwardly also removes the vacuum from chamber 60 and either applies pressure thereto or connects the same with the atmosphere. Thus, the actuation of push rod 297 removes from beneath the sheet material any suction applied through box 60, releases the tilt wheels 160 and 161, and releases the roller 46 so that the sheet material can either be adjusted manually or readily withdrawn from the apparatus.

In the foregoing explanation, reference has been made, at several places, to belt 34 as having apertures therethrough. In FIGURE 16, I have shown in section one possible form this belt may take. It will be noted that the belt has three layers, 420, 421 and 422. The base layer 422, which is the one which engages the various rollers, such as rollers 50 and 51, may be of a suitable homogeneous material having reasonably high tensile strength. One material which is suitable for base layer use is an oriented polyester film such as that commercially sold as "Scotchpar" made by Minnesota Mining and Manufacturing Company or "Mylar" made by E. I. du Pont de Nemours and Company. A metal, like stainless steel, can be employed as base layer 422 where one is to be particularly concerned with rigidity and toughness and/or the problem of eliminating static effects. Generally, the oriented polyester films are less subject to fatigue, however, than is stainless steel. The layer 422 is preferably about 10 to 25 mils thick and is provided on its underside with knurling or embossing in order to provide both a better friction grip with the soft surfaces of the rollers over which the belt rides, as well as to provide the minimum surface, smoothly curved "knurl peaks" to obtain a minimum friction effect where belt 34 passes over low friction material surfaces of pressure boxes 60, 62, and 126. The layer 421 may be of an epoxy type compound which has been pigmented with titanium dioxide, for example, for whiteness and with silver particles to give it some conductivity to reduce static effects. The outer layer 420 is held to layer 422 by layer 421. Layer 420 is formed of a cloth which may be of a white polyester fiber such as Dacron blended with cotton. In one particular example, I found the combination of 65 percent Dacron and 35 percent cotton as satisfactory. The fabric should have enough thread fuzziness to eliminate the glossy glare from individual fibers and to hide both the warp and woof threads as well as to minimize the visibility of the holes 423. The fabric should be treated with conductive material or antistatic material like certain fatty quaternary amine compounds so as to decrease effects produceable by static electricity. The layers 421 and 422 are provided with a plurality of apertures 423 therethrough. It is through these apertures that the negative and/or positive pressures in chambers 60, 62, and 126 and the positive pressure from the nozzle in the end of tube 135 may be applied to the underside of the paper or the sheet material overlying the belt 34. Furthermore, it is due to the presence of these apertures 423 that it is possible to pass the light from lamp 348 to the light sensitive cell 345. While the apertures do not extend through the outer fabric layer 420, both a portion of the light and the desired pressure effects are able to pass through the porous layer 420.

Reference has been made to the dewrinkling action which takes place in my paper feeding apparatus. The apparatus is provided with a number of expedients for minimizing any wrinkles that exist in the sheet material. In a sheet of business letter paper, which has been folded a number of times in order to permit the sheet to be inserted into an envelope, each fold is actually a specific type of wrinkle which is very common. Other types of wrinkles may arise due to careless handling and/or simply many normal handlings of the material. Such types include creased corners, ruffled edges, as well as moisture-puckered areas caused by inadvertent splatters of or immersion in water or by handling the sheet with moist or sweaty hands. Obviously, by the time that the sheet material reaches the viewing and processing region H as shown in FIGURE 2, it is desirable that its wrinkles be minimized so that any wrinkle-caused, undesirable effects (particularly those which influence scanning results or the results of other sheet processing steps) also will be minimized.

Each wrinkle can be considered to consist of two or more joined planes of sheet material. The joining line region of the sheet between any two of its wrinkle planes can be considered the hinge axis between those two planes, that is, the axis at which the planes were hinged or pivoted with respect to each other when the sheet was wrinkled. Thus an ordinary fold axis in a folded letter as mentioned above can be considered a wrinkle hinge axis for that specific type of wrinkle. FIGURE 17 furnishes, in cross-section, an illustration of a hinge axis region 418 with its adjoining wrinkle planes 417a and 417b; the cross-sectional plane is perpendicular to the hinge axis 418.

In minimizing wrinkles in a sheet of paper, it is highly desirable to repeatedly flex the paper about each of its wrinkle-hinge axes, since this tends to fatigue the structure of the sheet in these axis regions. Thus the more times a sheet of material is flexed about each wrinkle-hinge axis, the less will be the force its wrinkle-hinge axis structure can exert to return the sheet to its wrinkled condition wherein adjacent wrinkle planes are significantly tilted with respect to each other. It is also helpful in preventing any return of a wrinkled condition, after such fatigue-producing flexing, to spread the sheet into smooth contact with and then pressure hold it against a flat or cylindrical surface, as by a differential pressure.

Flexing a sheet of material at its various wrinkle-hinge axes can be accomplished partially for all hinge axes, regardless of their direction, by repeated "press and release" of the sheet against another surface and partially for those hinge axes of known direction by pivoting the entire sheet back and forth, at least slightly, around that known general direction of such hinge axes. My apparatus is designed to repeatedlp flex wrinkle hinges of each sheet in opposite directions by using both of these methods prior to the sheets reaching region H where it is spread into smooth contact with and pressure held against the face of chamber 62.

The "press and release" method is applied as follows: The sheet is pressed down on belt 34 in the region over chamber 60 by the pressure differential between the normal atmosphere and the lower pressure in chamber 60 acting through the openings of belt 34. Additional pressure is applied to the left, center, and right regions of the sheet (and released as the sheet moves past) by wheels 161, 185, and 160 which also serve as a part of the tilt control mechanism as shown in FIGURE 3 and FIGURE 9. Beyond chamber 60, there is a brief strip region wherein the pressing of the sheet against belt 34 is released. This strip lies between the differential pressure region above chamber 60 and the belt 44 pressure region below roller 46. From the pressure region under roller 46 to the pressure region above roller 51 in FIGURE 2, there is another region, between belt 44 and belt 34, where the pressure on the sheet is partly released. Also, from the pressure region above roller 51 to the pressure region at the upper right of roller 52, there is an additional region between belt 44 and belt 34 where the pressure on the sheet is partly released. Finally, just beyond where roller 52 presses belt 34 against the sheet and thus the sheet against belt 44, the roller 48 presses belt 44 against the sheet and thus belt 44 completes the smoothing or spreading (as will be described presently in connection with the special form of belt 44 illustrated in FIGURES 17, 18, and 19) of the sheet into smooth contact with belt 34 at the upper edge region of chamber 62 where a pressure differential again begins holding the sheet, now with its wrinkles minimized, on belt 34. In the nondifferential pressure region of belt 34 between chamber 60 and chamber 61, the back surface of the sheet is more free to slide on belt 34 and thus the sheet is free to spread out as wrinkle peaks are flattened by the "press and release" and other dewrinkling and spreading actions applied by belt 44 to the sheet in this region.

The other method, which is used for wrinkles of known directions, is employed for a generally transverse hinge axis direction, that is, for wrinkle hinge axes on the sheet which are parallel or essentially parallel to lines 140, 141, and 142 on lens 37 as the sheet passes between chamber 60 and chamber 62 on belt 34. The transverse hinge axis is subjected to extra dewrinkling emphasis in this mechanism because transverse folds in business letter paper are most common and frequently most difficult to minimize.

This means for dewrinkling emphasis of the transverse hinge axis will now be explained. As best shown in FIGURE 17, the paper is bent downwardly just after it passes over the top right-hand wall 425 of pressure chamber 60. Bearing strip 426 of low friction, scuff and abrasion resistant material, with a right-skewed, rounded-top cross section as in FIGURE 17, comprises the actual top of wall 425 in contact with belt 34. This downward bend given the sheet, just above and to the right of strip 426, tends to pivot the right-hand plane (plane 417b, for example) of each pair of adjacent wrinkle planes (planes 417a and 417b, for example) slightly clockwise around those of their wrinkle-hinge axes (axis 418, for one example) which are generally transverse to belt 34 and thus generally parallel to the top of wall 425, and to rollers 46, 51, 52, and 48. Upon passing underneath roller 46, the sheet material is flexed upwardly again so that the right-hand one of adjacent wrinkle planes pivot counterclockwise around these transverse hinge axes. Upon passing roller 51, the material is flexed considerably clockwise again. As will be noted from FIGURE 2, rollers 52 and 48 are relatively close to each other so that, when the material passes successively over roller 52 and under roller 48, the right-hand one of adjacent wrinkle planes is first again flexed considerably clockwise and then slightly counterclockwise in a relatively short period of time.

The provision of two clockwise flexings through a considerable angle help correct the common business letter transverse fold which is normally made when the sheet is originally folded for envelope insertion in such a direction that any portion on the right-hand side of a wrinkle axis is deflected counterclockwise with respect to an adjacent portion on the opposite side of the wrinkle axis, as with planes 417a and 417b.

It will thus be apparent that the wrinkle hinge axis regions of the sheet are stressed by clockwise and counterclockwise deflections with periods of "relaxation" in between with the result that all, and especially the transverse, hinge axis material structure becomes somewhat fatigued so that by the time these portions of the sheet have been transported on belt 34 to the beginning of region H just below roller 48, a moderate differential air pressure applied across the sheet through belt 34 will maintain the sheet material relatively flat on belt 34 as it passes through region H.

The dewrinkling system discussed above is quite effective even if belt 44 is simply a normal, flat belt. Such a belt may be constructed by laminating to the one side of a fiber or metallic mesh, a material having a reasonably low coefficient of friction and to the other side of this mesh either a surface material having a high coefficient of friction or a similar material which has additional friction-producing indentations and projections on its surface. The high friction surface of such a belt would be in contact with rollers 46, 47 and 48 and the low friction surface would be in contact with belt 34 or the top surface of any sheets being carried on belt 34 en route to region H. A normal, flat belt with the above or similar construction is used for belt 45.

However, if a special design is used, just for belt 44, not only are the dewrinkling actions just mentioned achieved, but also additional spreading and/or smoothing dewrinkling actions are concurrently produced. Whereas general and especially transverse axis wringles are minimized in each sheet by the above mentioned actions of a normal, flat design of belt 44, the additional spreading and smoothing actions produced by the special design of belt 44 used in my apparatus effect both additional general dewrinkling and particularly longitudinal axis dewrinkling in each sheet. Thus in sheet material being carried on belt 34, creases or wrinkles hinge axes which run generally parallel to the direction of belt 34 motion are especially acted on in my apparatus by the special design of belt 44 which will now be described.

Belt 44 has a bottom layer with a central woven reinforcement layer 434b (shown in FIGURE 17 for only a short portion of its extent) similar to the normal flat belt type described above; however, the top or outer surface of belt 44, shown in FIGURES 18 and 19, has a special herringbone pattern of regularly spaced raised strips or ridges of springy, elastic material with an embedded reinforcing weave 434a (likewise shown for only a limited number of strips 427). A cross section of this belt passing around roller 46, while roller 46 is in the clamped down position, is illustrated in FIGURE 17. In these figures, each of the raised strips having wave-like cross sections will be called a wave. The position of the FIGURE 17 cross section with respect to the length of roller 46 is designated by the line 17—17 in FIGURE 7.

The nature of this herringbone wave pattern requires that the thickness of belt 44 be about 2½ to 3½ times greater than a normal flat belt used in the same place. Consequently, rollers 46, 48 and possibly 47 would have to be made with a smaller diameter so that, with belt 44 in place, the effective diameter of these rollers would provide proper operation. For example, this is particularly important with drive roller 48 because through it, the speed of belt 44 is synchronized with that of belt 34. The radius of roller 46 (and to some extent, that of roller 48) has a very significant influence on the operational effectiveness of this herringbone wave type of belt: a smaller diameter roller 46 is useful in helping the waves open up prior to their contact with a sheet on belt 34. The necessity and use for this wave opening is explained later on.

In FIGURE 19, a small portion 417b of the outer surface of belt 44 is viewed (in enlarged form) as though one's eye were looking up toward region 417b, as shown in FIGURE 3, from about the position and in the direction designated by arrow 418. Since the view of FIGURE 7 is one looking down at the lower portion of belt 44 under roller 46 and that of FIGURE 19 is one looking up at the outer surface of belt 44, the outline of region 417b in FIGURE 19 is a mirror image of that in FIGURE 7. Also for FIGURE 19, one assumes that all of the structure between the viewing point indicated by arrow 418 of FIGURE 3 and belt 44 to be transparent, including belt 34 and a sheet being carried on belt 34.

At the center-line region of belt 44, the wave shapes are beveled from the wave tip level down to the center line at the wave trough level, as shown in FIGURE 19a. These bevel surfaces are designated by the numeral 431a in FIGURES 19 and 19a. The approximate plane of each bevel surface 431 is determined by two intersecting lines: the first, the belt center line at the wave trough level; the second, a line 432 projected from, and about at right angles to, the wave tip line on each wave, back to the point where the belt center line intersects the lowest part of the next wave trough. The "corners" formed by the bevel surfaces and the wave tips are rounded slightly as shown at 431b, for example, in FIGURES 19 and 19a. This rounding prevents these "corners" from projecting beyond the average wave tip extremity by too great a distance when the belt passes around rollers. If these wave tip corners did open out too far (such wave opening will be explained subsequently), as compared to adjacent wave tip segments, there could be the undesirable effect of an excessively "over-diameter" ridge in the center of belt 44 when it comes around roller 46 and makes contact with a sheet on belt 34.

As produced by the herringbone wave shapes in belt 44, the general and longitudinal dewrinkling effects on a sheet are partially like those smoothing effects which a human operator might attain by hand smoothing the sheet: Assuming a sheet secured at its top edge to a wider belt moving away from the operator across a flat surface, for sheet smoothing, a natural operator action for sheet smoothing would involve, first flatly placing his palms with fingers together near the top center of the sheet so the fingers of each hand nearly touch and form an angle of about 100° between hands, bisected by the center line of the sheet. Also assuming sheet motion parallel to its center line, the operator would next stroke his hands apart transversely along directions approximately perpendicular to the center line of the sheet and with moderate pressure. Repeating this placing and stroking action of his hands, each time from a starting point further down the sheet as the belt carried it away, the operator would partially dewrinkle the sheet by such stroking and/or smoothing action. In other words, his fingers (with assistance from the palms) would apply to the sheet, crests of wave-like surfaces (that is, the peaks of the rounded palmar surfaces of the fingers held flat and firmly in parallel together) which, when his hands are moved away from each other in directions transverse or perpendicular to sheet motion, tend to smooth the sheet transversely onto the flat belt very easily. Moreover, these hand motions could be called wave-like in that they involve several repetitive actions from top to bottom of the sheet.

Though it does not appear obviously possible for a single, preformed belt to provide simultaneously, the opposite, transverse stroking effects mentioned above, the herringbone wave belt does provide these effects by means of a wave-like action. Partially by referring to FIGURES 17 and 19, the means by which these smoothing effects are obtained through use of the herringbone wave shapes in belt 44 will now be explained, as will some of the results which these effects have on any sheet 430 being carried on belt 34.

As belt 44 approaches roller 46, all waves are in their "normal" positions as illustrated in the region of wave 427s in FIGURE 17. Notice at waves 427s and 427t the position (within each of the waves) of the reinforcing weave 434a. Now notice the wave 427w and the wave 427x. At these two wave positions, as the base material of belt 44 begins to bend around roller 46, the outer extremities of belt 44 will tend to be stretched out (i.e., placed under tension) because of the greater arc length which a given longitudinal increment of the outer surface of belt 44 must span to enable the belt's inner surface of base material to fit the curvature of roller 46. When this outer-surface tensioning occurs, the effect of most of it within one wave segment of belt 44 will occur at the trough region of the wave; that is, for example, the low region between waves 427w and 427x. This stretching will occur at or near the trough region because the reinforcing weave 434a near the top surface of each wave will prevent it from occurring there. This explains the need for a reinforcing weave or a less stretchable top-of-wave surface in belt 44.

Because this stretching occurs at the trough region between adjacent waves, they "open up" as they are beginning to do between wave 427w and wave 427x in FIGURE 17. The trough following wave 427x to the left and the one following it, etc., have completely opened, and it is obvious that the amount of such opening is determined by the radius of curvature of the surface of roller 46. Thus by selecting the proper roller 46 size, a desired degree of trough opening can be obtained.

The dashed line circle 43 in FIGURE 17 marks the distance from the surface of roller 46 which the wave peaks on belt 44 would trace if they did not open up. Actually, the effective diameter of roller 46 is regulated by the distance between the center of roller 46 and the "effective surface" of belt 44 formed in the region under roller 46 where the "back-bent" wave tips of belt 44 are in maximum pressure contact with the sheet. The circle 43 scribed in FIGURE 17 is therefore not the actual effective diameter but only a reminder that effective diameter must be considered.

An important factor in the herringbone wave design of belt 44 is that the angle of the wave fronts with respect to the center line of the belt must be such that the waves will open up when the belt passes around roller 46. Proper opening will occur for most wave shape designs when their wave fronts are placed at an angle of less than 45° with respect to a line perpendicular to the center line of belt 44 or, in other words, at an angle of more than 45° with respect to that center line itself. However, because back pull along the wave tips from portions of a single wave extending, say, over the top of roller 46 while the belt is passing around this roller, will cause the spaces between wave tips to close down rather than to open appreciably, angles of much less than 50° with respect to the center line of belt 44 for the wave tops of a wave pattern would not be suitable. The most suitable angles for the wave tops with respect to the center line of belt 44 would probably lie between 50° and 60°. It should be mentioned that the same effect, which causes the belt waves, with angles less than 40° to 45° with respect to the center line of belt 44, to close when going around a cylinder-like roller 46, also assists in opening the waves for belts with waves having center-line angles of more than 45° (or preferably in the 50° to 60° range as mentioned above). This effect is the longitudinal tensioning of a segment of an individual wave tip caused by the leading portion of that wave's length being near the center line of the belt (and thus, in a certain position of belt 44, partially if not completely around wave-opening roller 46) while the other extremity of that wave is near the edge of the belt (and not under the influence of the opening effect of the curvature of the roller). Of course, this tensioning, in turn, is brought about by the previously discussed tensioning in the outer surface of belt 44 as each wave bends around roller 46 with its wave front at a diagonal with respect to line 334 which is the axis of roller 46. This transverse wave tip tensioning effect must be considered to some extent when designing wave shapes for the belt: if the wave thickness is too small, this tensioning will actually cause the wave to collapse when it goes around the roller 46. Nevertheless, because of this tensioning effect in a properly designed belt, all wave tips are spread somewhat further apart as they pass around roller 46 than they otherwise would be at the position, say, of waves 427s and 427t in FIGURE 17.

Now we can consider what happens when each of these spread-apart wave tips pass around roller 46 and first come in contact with a sheet 430 on belt 34. In the cross section in FIGURE 17, the tip of wave 427z is an example. Notice first that the tip of wave 427z and the wave tip just preceding it, above and to the left, have behind them wave bodies which point essentially perpendicularly downward onto belt 34. Notice also in FIGURE 17 that the slight downward deflection of belt 34 caused by the down pressure on the right side of roller 46 through the various belts after the up pressure on the left side from the bearing bar end portion 426 of pressure chamber 60 helps make more waves (even including the second wave behind wave 427z) almost perpendicular to belt 34. Because these waves are perpendicular to belt 34 in this region, two important conditions are satisfied: (a) the wave tips can exert a maximum downward thrust on any large wrinkles or bulges which the sheet might contain in this region, and (b) the surface of the sheet can exert a maximum upward force against each wave tip which is at the same time acting in a direction parallel to the top and bottom surfaces of each wave body in turn. Also, the slightly convex-concave curved nature (as opposed to flat) of belt 34 between the bearing bar 426 and roller 46 gives the belt 44 wave tips both (a) a slightly more abrupt initial contact with each succeeding increment of sheet surface on belt 34 (since there is an "inflection line" on belt 34 where belt 34 ceases to curve downward beyond the bearing bar 426 and begins to curve upward to go beneath roller 46 and (b) a slightly longer region of wave tip contact and pressure application before full pressure is reached at the tip region under roller 46, and thus a somewhat more gradual application of wave tip pressure. For example, if it were originally higher, the bulge in the sheet located just under the tip of wave 427z could have been first contacted by wave 427z when it was one wave position to the left.

The tip of wave 427a is slightly blunted and wave 427a itself is broadened by the rather strong back pressure exerted by the sheet 430 as it is flattened as its wrinkle and fold facets are pivoting around their various hinge axes. The wave 427b is an example of a wave tip being slightly "backtoppled" or "backbent" because of these two facts: (a) these wave tips travel slightly above the speed of belt 34 since they have been fanned out by the curvature of roller 46 to give the belt a greater radial thickness than normal; and (b) as mentioned, the surface of the sheet began exerting its force against each wave tip in a direction parallel to the top and bottom surfaces of each wave body. Here it is important to cite another reason for having the reinforcing weave 434a of each wave at the top surface of the wave. Notice at wave 427b that the wave tip is bent back, more or less pivoting around its top surface with its under surface being rather highly stretched. If this under surface were not easily stretchable in comparison to the top surface, the wave tip would not "backbend" but would cause, or have a tendency to cause, the sheet to slip forward on the surface of belt 34 and pile up under and beyond roller 46 (if successive waves all acted the same way). However, because the wave tip readily yields to being bent backward about at line 429, this extra forward motion tendency is absorbed by the wave itself (see vectors LM and –LM acting on region WTB in FIGURE 19) and at the same time reasonably firm vertical pressure is maintained on the sheet against belt 34 directly under roller 46. The three waves to the right of wave 427b illustrate wave tips undergoing recovery (see also the WTR region in FIGURE 19) from being held in bent backward position between lines 429 and 428. In this region, such recovery is aided by the wave tip tension mentioned previously as caused by only a portion of the wave (in terms of a given wave's length from center line to the edge of belt 44) being subjected to the curvature of roller 46. Also, the inner surface of belt 44 bulges back up against roller 46 in the region of waves 427d and 427e while each wave tip "slithers" back (see region WTR in FIGURE 19) into a reasonably normal position. In effect, this recovery would be akin to a wave on a wave tip running down the length and along the tip of each individual wave in belt 44 and the amplitude of this wave along the wave tip would vary according to the back bending distortion such as that caused and illustrated at wave 427b. Such wave tip waves are also illustrated in FIGURE 19 where the waves 427q, 427p, etc. cross line 429 (approximate center of back bending region) and also where they cross line 428 (approximate center of back bent recovery region). As mentioned, the inner surface of belt 44 would be bulged up slightly beyond where it leaves contact with roller 46 between waves 427b and 427d; this is because of the slight pressure produced by the wave tip being in the back bent condition. This pressure too helps keep a rather constant effective diameter around roller 46 and thus helps establish desired speed relationships between the sheet and belt 44.

The wave 427f has essentially recovered from back bending except for moderate frictional forces and residual pressures from roller 46 as well as wrinkle axis caused back pressures from the wrinkle and fold facets of the sheet itself. Wave 427h is completely recovered and back to its normal belt 44 thickness position (as at wave 427s). Thus, finally, beyond some transverse line on belt 44 (just beyond line 428 on FIGURE 19 or about at wave 427d or 427e of FIGURE 17) all the wave tips will have recovered to their normal positions. So it is obvious that the FIGURE 17 cross section of belt 44 passing around roller 46 is somewhat of a caricature because waves 427f to 427h are a considerable distance beyond the position of wave 427e, but this is done to better illustrate in cross section what happens at the wave tips during recovery from back bending. Line 428 in FIGURE 19 illustrates better where this recovery occurs under roller 46.

In the belt 44 system the wave tip waves which ride the crests of the regular "herringbone-wave" belt waves originate where the beveled and rounded corner of each wave tip or crest terminates adjacent to the center line of the belt. As previously pointed out, beveled surface 431a and rounded corner 431b are illustrated in FIGURE 19. Since each such corner does not project out quite far enough when belt 44 passes around roller 46 to be back bent, the beginning portion of the top surface adjacent to rounded corner 431b on each wave remains in contact with the sheet or belt 34, whichever beginning portion is under belt 44 at the time as illustrated by wave 427m in FIGURE 19. Consequently, the start (see line 428) of the slithering wave tip wave occurs (see wave 427n) as soon as this near center line wave tip increment experiences a reasonable release of the pressure from roller 46 beyond its center line because, even though an adjacent portion of this wave crest slightly further from the center line becomes back bent (see wave 427m), and this back bent condition continues on down the wave to the WTB region (centered on line 429) where it first occurs. The back bent increment is closely preceded, just prior to the WTR region (centered on line 428), by an essentially recovered wave condition in which the top surface of the wave tip is still or again in contact with the sheet.

Thus, referring to the vector diagrams in FIGURE 19, it can be seen that when a wave tip increment makes contact with the sheet while that increment is in the spread open condition due to the curavature of roller 46, as previously discussed, this wave tip increment can exert a force against the sheet in the direction of RT (not shown, but for waves on the right side of the center line as viewed from the top of the machine) or LT (shown in FIGURE 19 for waves on the left side of the center line). Although both LT and RT are at right angles to the actual wave tip line which in turn is at an angle of about 40° with respect to the belt and sheet center line, and therefore also with respect to the direction of belt and sheet motion, they each can be broken into two effective components, for example: LM, the component in the direction of belt motion; and LD, the desired component in the dewrinkling direction needed to most appropriately dewrinkle the paper with smoothing forces acting from the belt 44 center line out to its edge in the region of line 429. If allowed to stand unchecked, LM and RM would be the components which, as previously mentioned, could cause the paper to slide on belt 34 and pile up just beyond roller 46. However, in this invention, both LM and RM are initially absorbed, or at least mostly absorbed, in a manner which renders them essentially ineffective, by the back bending effected at each incremental wave tip portion along each of the waves. As one may surmise from FIGURES 17, 18 and 19, this back bending is enabled by the proper herringbone-wave design and by the wave tip sheet contact conditions. These conditions are effected (a) partially by the "higher-than-sheet" wave tip speed which invokes a portion of the −LM (and −RM) sufficiently large to start the back bending deflection of each wave tip increment during the initial frictional contact upon a sheet of each wave tip increment and (b) primarily by pressure through the sheet from belt 34 acting essentially parallel to the undeflected top and bottom faces of each wave body but causing completion of the back bending once it is begun by −LM. Then, during recovery (from this back bending position) caused by the tip wave traveling out along each wave tip from the beginning of each wave tip near the center line, the forces from the LM and RM components are actually redirected by the wave tip wave so that they are essentially perpendicular to the cresh of the wave tip wave itself as represented by LD' in FIGURE 19.

These net resultants (LD' and RD') are therefore additional desirable dewrinkling and smoothing force vectors acting on the sheet some place within the strip region above and adjacent to line 428 in FIGURE 19. These vectors act outward from the center line of the belt. It is easy to visualize how vectors having the action direction of LD and LD' (together with RD and RD'), when appearing at the tip increment of each of the dozens of waves in the initial (near line 429) and second (near line 428) dewrinkling force regions, would impart to any sheet 430 moving on belt 34 a very real, dynamic smoothing and dewrinkling effect and it would be essentially the same type or force vector that the observer applied to the sheet manually in the description cited earlier in this discussion. Of course, in the above it will be understood that the same force and wave and resultant force conditions will apply to the right-hand side of the center line as sketched for the left-hand side of the center line in FIGURE 19. Therefore, the arrangement does indeed provide a wavelike acting pair of forces which act outwardly from the center line of a sheet in a manner similar to that provided in what might be termed "normal human dewrinkling action by manual methods."

As effective as the above described dewrinkling mechanism may be, belt 44 applies still more dewrinkling forces to the sheet when it is pressed against the sheet during passage over roller 51. In this case, each wave tip again pushes perpendicular to its axis in the direction of RT as it is clamped tighter and tighter against the sheet. As this is done, its top surface length remains constant because of the reinforcing weave but its undersurface will again permit a slight amount of tip back bending. This back bending mode will continue until belt 44 is clamped tightly against the sheet and belt 34 over roller 51. At this time, the trough of each wave increment will be completely closed by this pressure (note that pressure of roller 46 on belt 34 is such that the troughs of the waves remain mostly open after they have recovered from back bending). After each wave increment passes the region where pressure is exerted by roller 51, recovery from the back bending condition of this back bending mode again occurs by the same mechanism involving a "traveling tip wave" as described previously. Thus, again we have additional spreading and dewrinkling force on a smaller scale but still with vectors acting approximately perpendicular to the center line of the sheet (at least all such vectors should be somewhat parallel to the lines of character patterns if these lines of character patterns have been properly aligned by means of lens 40 so that they are perpendicular to the direction of belt 34 motion).

Similar initial dewrinkling vectors (like LM and RM) are produced by belt 44 as this belt acts against the sheet during the passage of the sheet on belt 34 over roller 52. Since the mechanism is the same as before, it will not be repeated in the description here; nevertheless, actual tip wave recovery is held off in this case along with the secondary dewrinkling forces by the extra pressure and close proximity of roller 48 and beneath it, the edge of the chamber 62 just beyond roller 52. Then, when the extra pressure is released and belt 44 is bent around roller 48, tip wave recovery never actually occurs in exactly the manner previously described where the sheet remains held between belts 34 and 44. Rather, the full effect of vectors like LM' and RM' is applied in combination with the "brushing effect" of the expanding tip-to-tip distance opening up between wave tips due to belt 44 curving around roller 48 so as to give the sheet a final smoothing action just as it enters the region H for scanning.

Some variation of belt 44 "wave form" designs also would be applicable. A wave form with gradually changing angle with respect to the perpendicular from the center line would be useful; in other words, the waves extending from the center line to the edge of belt 44 would have tip edges which follow the arc of a circle, or a segment of a parabola, beginning with an angle of, say 60° or 65° with respect to the belt 44 center line and gradually changing along the length of the wave until the tangent to this wave tip edge curve is at an angle of 45 or 50° with respect to the center line. The result from such a wave design would be a slowly increasing initial smoothing or spreading vector LD (as well as RD) plus increasing tip wave vectors LD' (and RD') as one goes from the center line region to the edge region of the belt 44. As, by center-outward spreading and smoothing actions, the puckering is removed from the wrinkles of the sheet near the center of belt 44, the same puckering is moved outwardly to combine with that remaining in other wrinkles nearer the edge of the sheet. So it is obvious that having, from the center of a sheet to its edge, slowly increasing lengths of such short smoothing strokes as those applied by the waves in belt 44 would be useful. Such increasing stroke lengths would keep this puckering or sheet slackness moving toward the left and right edges of the sheet and thus prevent sheet slackness from combining into any huge puckers, any one of which may then fold over upon itself before it reaches the edge of the material. Thus, belt 44 made according to this curved herringbone wave design could be especially effective for minimizing wrinkles in highly wrinkled sheets, extra wide sheets, and at higher motion speeds. This is particularly important where any operation such as scanning or photography are to be performed upon the sheet material because any wrinkles present in this sheet material tend to cause various distortions which occur in the mechanism's output as, for example, video signal noise, under or over exposure noise, etc. while any sheet is being scanned or photographed in regions H and L of FIGURES 2 and 6, respectively.

*Belt driving mechanism*

The mechanism for driving the belts is designed so as to provide substantially no backlash. It is very important to avoid backlash since it may be desirable under some conditions to stop, restart in forward motion or in reverse motion the operation of the feed momentarily, as will be explained later. The operations to be performed on the paper may be performed at such high speeds that it is also desirable to very quickly stop the entire series of belts and, an instant later to restart them, or to reverse them so that the sheets carried past region H on belt 34 will also stop as accurately and quickly as possible and may then be restarted or reversed immediately thereafter. For the same reason, I have provided means for quickly stopping and immediately thereafter beginning the restarting or reversing of the belts. This will be described in connection with the belt driving means.

Referring to FIGURE 20, there is shown in somewhat schematic form, the relationship between the driving mechanism of the various rollers. FIGURE 20 is a sectional view taken along a plane passing through FIGURE 7 just to the right of the left edge of the belts 34, 44 and 45 and looking to the left of that figure and with much of the main bearing plate 201 broken away. Referring to FIGURES 7 and 20, the numerals 435 and 436 are employed to indicate two main drive gears which are both firmly keyed to a shaft 437 which may be a stub shaft mounted on the left-hand main bearing plate 201 (as shown) or may be a longer shaft also journaled at its far right end in the mechanism's right side main bearing plate 326. The gears 435 and 436, plus cylindrical braking portion 478 (which will be presently discussed) are preferably formed as a single drive ring assembly with a minimum weight and a common bore and keyway to fit shaft 437. The smaller of the main drive gears, gear 435, is driven by the spur gear 438 which is mounted on a shaft 439 which is driven by the main drive motor. This shaft extends through and is journaled in the left main bearing plate 201. As best shown in FIGURE 7, the shaft 439 is connected to an electromagnetic clutch and reversing mechanism 440. This mechanism, which has not been shown in detail, may be any of well known types in which the input shaft drives two oppositely rotating clutch plates. The output shaft is connected to a cooperating clutch plate magnetically positioned to engage one or the other of the two driven clutch plates or to occupy an intermediate position. Such mechanisms are very old and well known and are not illustrated in detail in the present drawing. I have shown as extending from the clutch and reversing mechanism 440 three leads 441, 442 and 443. When power is applied to leads 441 and 442, the electromagnetic mechanism within the housing 440 is operated so as to engage the clutch to drive the output shaft 439 in a forward direction. When leads 442 and 443 are energized, the clutch plate is moved to engage the driven clutch plate which drives in the opposite direction so that the output shaft 439 is driven in the reverse direction. The input drive shaft to the clutch and reversing mechanism is designated by the reference numeral 445. This extends through and is journaled in subplate 446 which is fastened to the right-hand main bearing plate 326 and terminates in a gear 447 which meshes with a worm gear 448 driven by a motor 449 secured to the right-hand side of the right main bearing plate 326 (as viewed in FIGURE 7). The motor 449 is normally energized so that shaft 445 is continuously rotating when the apparatus is "standing by" to be operated. Whenever simultaneous motion of belts 34, 44 and 45 is desired by driving the various rollers, a circuit is completed between a power supply and leads 441 and 442, as will be presently described, to engage the electromagnetic clutch and cause the forward rotation of drive gear 438 which in turn causes rotation of the entire drive ring assembly by means of the small drive gear 435.

The two drive ring gears 435 and 436 are connected through antibacklash gears secured to the left-hand ends of the shafts of the various rollers, assuming one's viewing orientation is from the top and front as in FIGURES 6a and 7. Referring first to the driving means for the rollers associated with belt 34, it will be noted that the outer drive gear 436 is connected through an antibacklash gear 450 and a shaft 451 to the roller 50. The smaller drive gear 435 is connected through an antibacklash gear 452 and a shaft 453 to the roller 51. The large drive gear 436 is also connected through an antibacklash gear 455 (as shown in FIGURE 20) to the shaft of roller 53. The small ring gear 435 is connected through antibacklash gear 456 to the shaft of roller 54. Thus, of the five rollers 50, 51, 52, 53 and 54 over which belt 34 passes, four of these are directly driven by one or the other of the two drive gears which are rigidly secured together and rotate as a unit. By having a number of the gears associated with the rollers all driven through antibacklash gears by a common driving means, backlash is substantially eliminated. This is due to the fact that the entire belt drive mechanism is, in effect, a "locked gear and belt train." Thus any one roller is being driven not only directly from the same drive ring gear assembly as all other driven rollers but also by all other rollers acting through the belt 34 (or belts 44 or 45 as the case may be).

Of the three rollers carrying belt 44, only roller 48 is directly gear driven but belt 44 is partially driven also by belt 34 through contact friction forces. This gear driven roller is secured to a shaft driven by an antibacklash gear 459 which is coupled through an idler gear 460 to the smaller drive gear 435. Of course, the two other rollers 46 and 47 are positively driven through the belt 44, even though there is no direct connection between these rollers and the two driving gears 435 and 436. While I have shown rollers 46, 47 and 48 as of the same diameter as the other rollers associated with belts 34 and 45, it is to be understood that where a belt such as shown in FIG- URE 17 is employed, these rollers 46, 47 and 48 may be of slightly smaller diameter to compensate for the increased thickness of belt 44, as previously mentioned, due to the presence of the ribs 427.

Of the three rollers carrying belt 45, roller 57 is driven by gear 461, preferably of the antibacklash type, this gear meshing with gear 455 which, as previously pointed out, is driven by the larger drive gear 436. Also, as with belt 44, belt 45 is driven by belt 34 through contact friction forces.

While I have shown one particular driving gear and belt arrangement, it is to be understood that these gears and belts may be disposed in various configurations depending upon the particular application. Depending upon the desired disposition of the belts, it is possible to employ one main drive gear, two drive gears which are disposed on parallel but spaced axles and even, in some cases, three drive rings. In each case, the drive rings will all be positively driven, so as to form a locked gear train, by direct connection with the spur gear driven by the motor.

As pointed out above, shaft 329, to which roller 46 is secured, is journaled in sleeve 328 and fastened to arms 49. All of the shafts to which the other rollers are secured are journaled either in the right-hand or left-hand bearing plate structures either directly or indirectly. The right-hand main bearing plate structure is made up of several subplates which are fastened across belt removal gaps to the actual right-hand bearing plate 326. A subplate 446 has already been discussed in connection with drive shaft 445. A separate subplate is provided for each of the roller groups 46, 47 and 48 and 56, 57 and 58; these subplates also are fastened across appropriate belt removal gaps to the actual right-hand main bearing plate 326. The shafts for rollers 58 and 54 are both indirectly journaled to the left-hand main bearing plate 201 and the right-hand main bearing plate 326. By indirectly it is meant that the shafts of these rollers are directly journaled only in movable bearing blocks which blocks, in turn, are slidably affixed to the left-hand and right-hand main bearing plates so that the bearing plates can be moved along the circular arcs shown for those four rollers in FIGURE 20. Similar movable bearing blocks are slidably affixed to the left main bearing plate and the right subplates associated with rollers 48 and 56 so their shafts can be moved both along the circular arcs and along the general radial directions shown in FIGURE 20. Thus, these rollers can be adjusted to provide proper pressures against adjacent belts (as for rollers 48, 56 and 58), proper belt tensions and belt steering.

By sliding roller 54 to the right in FIGURE 20, belt 34 is loosened sufficiently for removal. This removal can be made through the gaps which are opened in the right side plate structure when the main plate fastenings for the subplates of the belt 44 and 45 roller groups associated with belts 44 and 45 are removed, together with both those fastenings for subplate 446 in which drive shaft 445 is journaled and the motor 449, belt 34 can be removed from the assembly for repair or replacement. By simply sliding roller 54 to the left in FIGURE 20, belt 34 is tightened. Of course, in FIGURE 20 by moving one end of roller 54 left and the other right, it is obvious that belt 34 can be steered so it will maintain a position closely centered on all rollers and any tendency for belt 34 to drift toward the left or right bearing plates can thus be corrected. Such means for correcting the position of belt 34 by adjusting and locking the end bearing positions of roller 54, though not shown here, could be controlled manually or automatically. Likewise, means for correction and control of the tension of belt 34, which also involves adjustment of the end bearing positions of roller 54, is not shown here but could be manual or automatic and associated with the steering means for belt 34.

By sliding roller 48 radially toward or away from the center of roller 47, belt 44 can be loosened or tensioned, respectively. Also, by sliding roller 48 clockwise or counterclockwise along the arc of a circle whose center is that of roller 47, the pressure of belt 44 against belt 34 under roller 48 can be adjusted. And, of course, by adjusting the radial distance between the left end of roller 48 and that of roller 47 to be different than that distance between the right end of roller 48 and that of roller 47, belt 44 can be steered so that it will run nicely centered on rolers 46, 47 and 48 with the proper tension and also with the proper pressures on belt 34.

Radial and arc adjustments of roller 56 with respect to roller 57 and belt 34 provide the same steering tensioning and pressuring capabilities for belt 45 as described above for belt 44 where roller 48 is adjustable.

It is a significant feature of this invention that all these above system adjustments are available while maintaining a "locked gear-and-belt train" among the elements of the system. Note for example to maintain this "locked train" condition, idler gear 460 and drive gear 456 of roller 54 can be moved clockwise and counterclockwise along arcs centered on shaft 437 so that regardless of the position of these gears along their respective arcs they are always properly in mesh with gear 435. So also gear 460 always can be adjusted as needed to mesh properly with gear 459 secured to the shaft of roller 48, regardless of the adjusted position of roller 48.

To minimize inertia in the belt driving system, low inertia designs for moving parts are used wherever possible. Thus, typically, rollers are thin-walled cylinders with short shafts. These shafts extend only from a wafer group fastened within the last, say, ½" to 1" of the end of each cylinder to where each shaft is journaled or to where each of certain shafts are secured to a gear. The wafer group mentioned consists of two or three closely-spaced washers secured to the shaft at their center holes. Likewise, the one piece drive ring structure previously mentioned as including roller drive gears 435 and 436, and also including, as will be described presently, braking cylinder 478, not only provides a very minimum of inertia for the structural dimensions it must satisfy for roller drive gears 435 and 436 but also provides, with minimum additional inertia, a large braking surface 478, positioned so its effective braking lever arm is long (note radius of surface 478 in FIGURE 20), all so that a maximum rate of belt 34 deceleration can be attained after brakes are applied. Thus, in combination with all the other features available in my sheet handling apparatus is the means available to very quickly stop the apparatus so that any sheet material carried on belt 34 will stop moving in a very short distance when the stop signal is given.

In FIGURE 21, there is illustrated a portion of the mechanism used when it is desired to manually position the various rollers. In initially lining up the sheet material as it passes beneath the lens 37, the operator may find it desirable particularly when the roller 46 is in the lowered position, shown in FIGURE 2, to have means for manually adjusting the rollers to provide for a slight shifting of the sheet material being handled on belt 34 so as, for example, to bring a particular line of indicia to a proper point with respect to guide lines 141 and 142 on the lens 37. This is accomplished by depressing the outer ring 22 and then rotating this ring. As shown in FIGURE 21, one of the three pins 214, which is the one not visible in FIGURE 10, is adapted to extend between the tow arms of a yoke member 465 which is journaled on a bracket 466 extending from the bracket member 206. The bracket member 465 is secured to a shaft 467 which carries a sleeve 468 in which is journaled a shaft 469 carrying a spur gear 470 at its upper end and a worm gear 471 at its lower end. An idler gear 473 is supported by the outer flange of bracket 206 and by bracket 466 and extends through an opening in outer wall 208 of bracket 206 to be permanently but slidably meshed with the teeth 472 on the outer surface of knob 22. When the knob 22 is depressed, the assembly including shaft 469 and gears 471 is pivoted on shaft 469 in a counterclockwise direction as viewed in FIGURE 21 to bring the spur gear 470 into engagement with the idler gear 473. Rotation of knob 22, which is possible by reason of the bearing ring 475, causes rotation of gears 473, 470 and the shaft 469 and consequent rotation of worm gear 471. As best shown in FIGURE 20, the pivoting on shaft 467 of the assembly and shaft carrying the gears 470 and 471 in a counterclockwise direction brings spur gear 470 into engagement with idler gear 473 and simultaneously worm gear 471 into engagement with the teeth of gear 450 which, as previously explained, is in engagement with the large drive ring 436. It is evident that rotation of shaft 469 through the teeth 472 carried by the outer surface of ring knob 22 and spur gear 470 will cause rotation of the large drive ring 456 which as has just been explained is coupled to all of the rollers. It will thus be obivous that by the expendient just described, rotation of knob 22 when depressed in this manner permits the operator to move the entire roller belt system arrangement and to advance or retract the sheet material carried on belt 34 by any desired amount.

While I have shown no arrangement in connection with knob 22 for controlling the clutching mechanism 440 plus the brake solenoid 485, it is to be understood that in parallel with other means provided for disengaging the clutch 440 and momentarily engaging the brake solenoid 485, a switch may be associated with knob 22 which has a switching element in series with one of the leads 441 and 442 and which is actuated when the knob 22 is slightly depressed to open the circuit to the clutching mechanism 440 and close a momentary circuit to solenoid 485. This switch, arranged to be actuated by knob 22 in the same manner as switch 266 is arranged to be actuated by knob 24 in FIGURE 13, will be referred to as switch 495 in connection with FIGURE 22. Thus worm gear 471 can never be engaged without removing the driving power from the system and braking it to a stop in the maner described next.

As previously indicated, it is desirable to abruptly stop the motion of the various rollers when the driving gears 435 and 436 are declutched from the driving motor 449. In order to accomplish this, I employ a braking means which is automatically energized via a switch 266 whenever the driving gears are declutched from the driving motor by action of switch 266. This braking means is also momentarily energized via a section of switch 495 whenever the driving gears are declutched from the driving motor by action of switch 495.

I have shown this braking means in somewhat simplified form in FIGURE 20. As can be seen in FIGURE 7, the main driving gear 436 has a cylindrical portion 478 of reduced diameter which projects to the left as viewed in FIGURE 7. The outer surface of this braking surface 478 is shown in dotted lines in FIGURE 20. A brake shoe 480 is adapted to be moved into engagement with the surface of this braking drum 478. The brake shoe 480 is carried by a lever 481 pivoted at pin 482 which is fastened to the left main bearing plate 201. The lever 481 is in turn connected through a pivoted link 487 to another lever 483 which pivots on pin 484 fastened on the left main bearing plate. The lever 483 is pivotally connected to the solenoid core 484 of a solenoid 485 which has a winding 486 and is mounted upon the left main bearing plate. As will be explained in connection with FIGURE 22, the braking winding 486 is energized each time that the clutch is de-energized via switch 266 or switch 495. While I have shown only one brake shoe 480 engaging one side of the drum, it is to be understood that brake shoes may be provided on opposite sides of the braking drum 478 so that braking pressure is simultaneously applied to opposite sides of the braking drum. Such expedients are well known in the art and for purposes of simplicity, the details thereof have not been shown.

Referring to FIGURE 22, I have shown in highly simplified form the electrical connections to the brake solenoid winding 486 and to the electromagnetic clutch and reversing mechanism 440. One switch used for controlling these mechanisms is switch 266 referred to in connection with FIGURE 13. This switch has a single pole double throw section in which contacting element 490 is adapted to engage either of two fixed contacts 491 and 492 with a snap action upon successive actuations of the plunger 267. Switch 266 determines whether brake solenoid 485 is constantly energized or the clutch mechanism 440 is energized. The contacting element 490 is connected to one terminal of a power source 493 through switch elements 495a and 494. Power source 493 may be of any suitable type to provide the desired voltage to the solenoid winding 486 and the electromagnetic winding of the clutch mechanism of unit 440. The other output terminal of the power source 493 is connected to ground at 496. The switch element 494 may be a section of a main "standby-operate" switch which is used to apply operating power to a number of the subsystems of the equipment and which, when in the standby position, prevents either the brake or the clutch mechanism from being energized. Another switch used for controlling clutch 440 and solenoid 485 is switch 495 which is used when the mechanism of FIGURE 21 is employed for manually moving the belts and thus longitudinally positioning the sheet materials carried by belt 34. This switch 495 has a single pole, single throw section in which contacting element 495a is adapted to disengage fixed contact 479 whenever the plunger of switch 495 is held in the depressed position. Also switch 495 has a single pole, double throw section in which contacting element 495b normally engages fixed contact 489a and is adapted to disengage contact 489a and engage fixed contact 489b whenever the plunger of switch 495 is held in the depressed position. The plunger of switch 495 would be actuated by the depression of knob 22, as pointed out previously. Thus depression of knob 22 would disconnect the circuit to the clutch connection 441 or brake coil 486, depending upon the condition of switch 266 and would connect brake coil 486 through conductor 497, contact 489b, element 495b, capacitor 488, and switch section 494 to power source 493. The charging current for capacitor 488 thus passes through coil 486, causing momentary actuation of the brake solenoid and momentary application of braking forces to the drive ring assembly. The amount of capacitance chosen for capacitor 488 will determine the length of time braking is applied and the strength of the braking force. Of course, release of knob 22 would allow element 495b to return to contact 498a; this resets capacitor 488 for another knob 22 actuated momentary brake application by discharging that capacitor through conductor 477. Thus one can understand how the initial portion of the depression stroke of knob 22 causes disconnection of driving power to, and momentary braking of, the belt drive assembly so that, when the bottom of the stroke is reached and gear 471 engages gear 450, the belt drive assembly, including gear 450, is essentially stationary and free to be rotated by rotation of knob 22.

When switch 266 is in the "off" position, contacting element 490 is in the position shown in FIGURE 22, in which it is in engagement with fixed contact 491, and a circuit exists to the solenoid winding 486 as follows: from the power source through switch contacting elements 494 and 495a, contact 479, contacting element 490, contact 491, a conductor 497, solenoid winding 486 and ground connections 498 and 496 back to the power source. When the contacting element 490 is in its other circuit controlling position, namely the "on" position, in which it is in engagement with fixed contact 492, a circuit is established as follows: through the conductors 441 and 442 of the clutch mechanism, from the power supply through switch elements 494 and 495a, fixed contact 479, contacting element 490, fixed contact 492, conductor 499, input conductor 441, clutching mechanism 440, conductor 442, through ground by way of ground connections 500 and 496 and back to the power supply. It will be apparent from the above that when contacting element 490 of switch 266 is in one position, the brake winding is energized and the clutch is de-energized. When the contacting element 490 is moved to its other position, the clutch mechanism is energized and the brake is de-energized. Thus, whenever knob 24 is depressed to bring pin 260 in engagement with plunger 267 of switch 266, the operation of the driving mechanism for belts 34, 44 and 45 is either started or stopped. When the belt driving mechanism is operating, the depression of the knob 24 moves the switch contacting element 490 of switch 266 from engagement with contact 492 to engagement with contact 491. This will result in removing the driving power from the main drive gears 435 and 436 and immediately applying a braking action thereto by operation of the braking solenoid 485. The result is that the rollers and the belts they carry are brought to an abrupt halt with a minimum amount of override.

While I have shown only the manually operated switch 266 as determining whether solenoid 486 or clutching mechanism 440 is energized, it is to be understood that where the apparatus is employed for relatively complex functions such as scanning, automatic apparatus may be employed for selectively starting and stopping the rollers. Similarly, I have shown no means of controlling the energization of conductor 443 which operates the reversing mechanism. Again, in the case of automatic equipment, this reversing mechanism could be automatically operated whenever it has become necessary to suddenly stop the rollers. Inevitably, there will be a slight amount of override and the reversing mechanism could be brought on automatically for a short time period to bring the sheet material being carried on belt 34 back to very near its position at the time the stop signal was generated. Similarly, it is also possible to provide a manually operated reversing switch connected to conductor 443 for selectively reversing the direction of the belts when desired.

*Overall operation of apparatus*

The operation has been described somewhat in detail in connection with the various components of the apparatus. The overall operation will now be briefly reviewed.

Let it be assumed first that individual sheets of material are being inserted into the machine. The operator is seated in front of the machine as shown in FIGURE 6a. The sheet is inserted through the slot 26 into the throat portion 27, shown in FIGURE 3. The main power switch has been actuated to turn on the various lights, the main drive motor 49, and the power supplies for the various amplifiers and control equipment. This main power switch has also placed in operation the positive pressure source and negative pressure source.

Under these conditions, the sheet material will be inserted until it passes beneath the lens 37 as best shown in FIGURE 3. Cylindrical lens 37 is in effect a man-machine transducer although in some embodiments it can also be a machine-machine transducer. That is, it serves to make any lines of character patterns on the input sheet, as well as the condition of the input sheet itself, more meaningful to the operator of the system. In this sense, lens 37 has four distinct and separate uses:

(1) It magnifies the line of character patterns in the vertical direction (that is, the direction in which belt 34 moves) at least two or three times, making it easier for the operator to observe them during the actual sheet alignment process.

(2) Lens 37 magnifies or, better, amplifies the tilt of each line of character patterns and thus makes the tilt inspection and correction procedures easier and more accurate for the operator. If the operator slowly slides, in a direction perpendicular to lens 37, a sheet containing lines of character patterns through slot 27 and under lens 37, he can properly observe through lens 37 the images of any character patterns visible when his eye is about 15 to 30 inches from the top surface 40 of lens 37. If, indeed, these lines of character patterns are parallel to the axis of lens 37 and thus to lines 142, 141 and 140, he will see a line-by-line series of horizontally disposed images extending parallel to lines 142, 141 and 140 sweeping across lens 37 from front to rear as sheet motion continues. These images are, of course, the vertically magnified lines of character patterns themselves.

To demonstrate tilt amplification characteristics of lens 37, the sheet can be tilted clockwise from that position in which its lines of character patterns are parallel to lines 142, 141 and 140 by moving its right-hand edge backward, toward the operator. Either static or dynamic tilt detection is possible using lens 37. With the sheet stationary for static tilt detection, for example, a 2° actual line tilt with respect to, say, line 141 on surface 40 of lens 37, would appear to the operator as a 3½ to 5° tilt when observed through lens 37 between lines 140 and 142. The exact tilt amplification observable would depend upon the curvature and spacing between surfaces 40 and 41 of lens 37 and also upon the spacing between surface 41 and the sheet carrying the lines of character patterns.

When the sheet, with this clockwise tilt, is sliding under lens 37 for dynamic tilt detection, the operator will observe through lens 37 a series of slightly distorted S-shaped configurations of the lines with character patterns, all parading from the left to right (in the direction of that sheet edge which was moved backward) across the viewing area of lens 37. If the tilt of the lines is increased by moving the right-hand edge backward further and the sheet is again passed underneath lens 37, the operator will notice an increase in the number of these S-shaped configurations per inch of longitudinal direction of lens 37 and a compression of their S-shape to give it more the appearance of an integral sign. If the sheet is tilted counterclockwise by moving the left edge backward and the sheet is again moved under lens 37 as before a parade of 2 shapes moving to the left (in the direction of the edge which was moved backward) will be seen by the operator.

Another way of describing these S or 2 patterns is to say that they, when first seen, give the appearance of a "screw thread" tilted and, if the sheet is in forward motion, moving with respect to the longitudinal axis of lens 37. Thus, in dynamic tilt detection, the operator would see the screw motion to the right or to the left depending upon whether the lines of character patterns have been mistilted clockwise or counterclockwise from perfect alignment with the longitudinal axis of lens 37.

By means of lens 37, the average operator would be able to align, statically, a line of character patterns on each input sheet with an accuracy of ±1°, or, with more experience, ±½° from the longitudinal axis of lens 37. Moreover, because of the motion of the S patterns to the right or the 2 patterns to the left, the operator of the machine could easily detect, dynamically, while a sheet is actually being fed into the machine under lens 37 whether each line of its character patterns is correctly aligned or whether it is tilted and if that tilt is greater than ±1° to ±2° from the longitudinal axis of lens 37. Of course, automatic electronic circuitry, not shown or described here, can be coupled to the machine by a lens 37, preferably one without detectable scribe lines on its surfaces 40 and 41 and can be used to detect the presence of this tilt, at least tilt above ±1°. This circuitry would feed back signals to the brakes as illustrated in FIGURES 11 and 12 on the left and right tilt wheels so as to automatically adjust the alignment of the moving sheet to correct for this tilt. However, using knob 23 and switches 281 and 282 as shown in FIGURES 13 and 14, the operator can manually feed such tilt correction signals to the brakes.

(3) The lines scribed on lens 37 are used by the operator both for alignment and gauging.

(a) The longitudinal lines 140, 141 and 142, of course are used for tilt alignment reference marks.

(b) The lines 140, 141 and 142 are also used to gauge the size of the character patterns in the line of character patterns being positioned. Since this system is designed to accept character patterns between 75% and 150% of some specified "100% normal height" character patterns, the size relationship between the shortest (75%) and the highest (150%) character pattern acceptable is actually 1 to 2. Thus, in this embodiment, the two longitudinal lines 140 and 142 on the top surface 40 of lens 37 are equally spaced from line 141 on surface 40 so that the distance between the front line 142 and middle line 141 represents the character height the operator would observe through lens 37 with his eyes at say, 15 to 30 inches from the lens (as they would be when he normally inserts and tilt positions a sheet of media) when the sheet, held flat against belt 34, contains 75% normal height character patterns. Similarly, the distance between the bottom line 142 and top line 140 would be representative of the character height served by the operator through lens 37 when the input sheet contains characters 150% normal height. Thus, by using this very simple optical gauging check using lens 37, the operator would have assurance that the lines of character patterns being input are within the size capabilities of the machine.

(c) There are eleven transverse lines, 143 through 153, scribed on the bottom surface 41 of lens 37. In this particular embodiment the "scribe" line 148 in the center is actually a deep cut part way through lens 37 to permit passage of the tilt correction drive shaft 175. Similarly, the second lines 144 and 152 scribed from each end of lens 37 are actually slits cut part way through lens 37 to allow respective portions 163 and 164 of the tilt correction framework of this embodiment to pass through. However, it should be pointed out that these thus highly emphasized scribings at the two ends and center have highly emphasized meanings for this embodiment. If not cut part way through to allow some of the tilt correcting mechanism to pass, lines 144 and 152 and line 148 would require emphasis in some other manner. Obviously, the center transverse scribe is important because it is well to provide a "benchmark" by which the operator can keep each sheet of input material centered. However, the outer two highly emphasized transverse scribes 152 and 144 represent the limit to the left and to the right, respectively, of the maximum length of a line of character patterns which this machine is capable of scanning or photographing, for example. Thus, it is important that all the lines of character patterns on the sheet be aligned so that they are within the lens 37 space between the outer two, heavily-scribed lines 152 and 144. With these lines as guides, the operator can easily align the lines of character patterns on the input sheet by moving the input sheet before it is clamped on belt 34, from left to right under lens 37.

(d) All lines 143 through 153 scribed transversely on the underside of lens 37 are used to gauge, as well as to position, lines of character patterns with minimum line lengths for better automatic processing internally. Also, they are used to position short integral groups of character patterns in one line so that the white levels around these character patterns will be more appropriately sensed by automatic mechanisms in the machine. In the mechanism being described, the transverse lines 143 through 153 are spaced 0.9 inch apart. This represents the spacing for nine normal width character patterns in one line, which is the minimum character pattern line length on which accurate automatic sizing and tilt adjustment can be made inside the machine itself. Therefore, if the first line of character patterns is shorter than nine normal characters, that is, 0.9 inch, (this nine character size is based on this machine's "100% normal width" character patterns, exemplified by normal size pica typewriting), the operator can gauge this "too shortness" by means of the transverse lines on surface 41 of lens 37 and align the sheet by using a subsequent line which has more character patterns.

(e) The transverse scribed lines 143 through 153 on lens 37 serve another purpose related to left-right positioning. Internal to the system, light level for tilt sensing in one embodiment is set according to groups of three photocells on a special "stick sensor" not shown here. The "stick sensor" is so aligned with respect to region L in FIGURE 6 on belt 34 and thus with respect to lens 37 that these groups of three photocells are approximately centered (for zero tilt input) at the center of each region marked off by 0.9 inch transverse scribings. Thus, when the operator observes a first line of an input sheet which is short but still is longer than the 0.9 inch gauge distance between two adjacent scribe lines he would position the sheet (taking into consideration, of course, other lines of character patterns later on on the sheet so that they do not go past the limit lines 144 and 152) so that this short line would enter the machine on belt 34 more or less centered on the region between two adjacent and conveniently nearby transverse scribed lines.

(4) The final use of lens 37 relates to a simultaneous detection which is possible while the operator is engaging in any one or all of the above manipulations for which lens 37 is utilized: he can obtain a reasonably good approximation of the "flatness" or "freedom from wrinkles" of the input sheet on which the lines of character patterns are located. Wrinkles are unwanted in many uses of this system not only (a) because they introduce "white-level noise" which makes the scanning signal more difficult to manipulate to obtain representations of pattern intensity which are reliably representative of the pattern and its contiguous sheet areas, but also (b) because sheet wrinkles tend to limit the firmness with which the sheet which holds the lines of character patterns can be held, in turn, onto the surface of belt 34 by means of a moderate pressure differential applied through belt 34. This ability to detect sheet unevenness with lens 37 is based on the principle that the lens vertically magnifies more those images at a slight distance from its surface 41 than those images which are essentially in contact with surface 41. Thus, if a sheet is badly wrinkled, or entirely too irregular, when it is inserted past lens 37 through the approximately 0.06 inch to 0.09 inch spacing which may be provided between the bottom surface 41 of lens 37 and belt 34, it will either not get through this narrow slot or be restrained by it in the one case or, in the other case, if the wrinkles are less severe but still bad enough to cause possible difficulty, for example, with white-level, character, etc. types of noise or with the vacuum holding, in spite of the dewrinkling effects which can be produced by the belt 44 system, the operator would notice a significant variation in character pattern height as he observes a given line of characters through lens 37. Those characters in contact with the bottom surface of lens 37 would appear smallest and those which are furthest away, where the sheet is in firm contact with belt 34 would appear largest; where this variation between characters appears most abrupt there obviously exists a very abrupt wrinkle or discontinuity in flatness of the sheet carrying the line of character patterns. With experience, an operator can judge the relationships between these variations in character size and the feel and weight of the paper he has just inserted to determine whether it would be advisable (a) to remove the sheet of paper and flatten it more completely by hand before reinserting it, or (b) if (a) has been tried several times previously to no avail, to place that particular sheet on a reject stack, or (c) to enter the information into the system manually by means of the keyboard, or finally (4) to let it run through the system with the anticipation that there could be a considerable number of processing problems.

It is well to point out here that the same property of lens 37 which makes it possible to detect wrinkle irregularities in an input sheets surface can also provide some difficulty in the utilization of the longitudinal, size gaugng lines 140, 141 and 142. The somewhat wrinkled sheet, because of the slight character size variation which he would see through lens 37, could give the operator this question: Are the character patterns too large or too small? However, depending upon the exact configuration of a given system there are two solutions whereby this problem can be eliminated. (1) In a machine equipped for manual feed only, which has no provision for establishing a negative pressure in chamber 60, the operator can depress knob 21 to engage tilt wheel bevel gears 174, 171 and 173 (assuming these wheels 160 and 161 have been already clamped in place by depressing knob 22 and, while holding knob 21 depressed thus holding the paper firmly in place under tilt wheels), he can pull backwards on the sheet through the entrance slot 27, holding the top surface of the sheet against the top surface 32 of entrance slot 27. This would cause the paper to be stretched with decreased wrinkles across the bottom surface of lens 37. Thus, in this first solution, the longitudinal gauging lines 140, 141 and 142 would have a spacing for gauging character heights based on original character images held in contact with the bottom surface 41 of lens 37. (2) In machines in which a negative pressure can be established in chamber 60, a standard moderate negative pressure would be turned on during the process of gauging character pattern height with lens 37. Of course, for this machine, the lines 140, 141 and 142 would be ruled with spacings conforming to the size of character patterns when the pattern carrying sheet is held smoothly against belt 34.

In this second case, wrinkle detection would be based on a sheet already partially smoothed by the standard negative pressure effects acting through belt 34 and thus quite meaningful because of this pressure standard. However, holding the sheet against the bottom surface 41 of lens 37 also tends to remove some wrinkles and, therefore, would give an approximation of the wrinkle quality of the sheet which one might expect when it is held onto belt 34 with a pressure differential within region H in FIGURE 2. Of course, operator experience would have to dictate the amount of improvement which could be expected in the wrinkles detected by observation through lens 37 after the sheet has passed through the mechanisms dewrinkling system.

Although not shown in FIGURE 2, a cylindrical lens just like lens 37 could be used for checking tilt and dewrinkling directly at the beginning of region H. In this case the lens would be mounted directly below roller 48. Of course, to allow room for this additional embodiment in region H, the distance between rollers 48 and 56 would have to be increased or the maximum usable height of region H would be lower. In any case, since lens 76 is about at the same distance from belt 34 in region H as the minimum viewing distance mentioned (15 inches) for lens 37, the information which the cylindrical lens below roller 48 would detect in region H with respect to tilt, size, etc. would be projected by lens 76 and mirrors 77 and 78 onto the very bottom region of screen 75, but it would be magnified on screen 75 by a factor of 2. If this were done, screen 75 would probably require heightening so that a sufficient portion of region H would still be displayed above the image from the lens under roller 48.

With the second cylindrical lens displaying its results directly on screen 75, the operator could soon become familiar with how certain input sheets have been flattened by the mechanisms dewrinkling system; the operator would also know quickly whether a perfectly adjusted sheet input under lens 37 was arriving in region H with the correct tilt. If belt 44 is not pressure adjusted quite right or if, say, one of the tilt wheels 160 or 161 is dragging, etc. there could be a discrepancy that would be worth while noting and adjusting.

With the above ramifications of lens 37 operating usage in mind, its application in combination with the rest of the mechansm can be discussed. Of course, the bulbs 42 are energized to illuminate the sheet adjacent to the lens. Assuming the sheets are fed manually, the frame 162 carrying the tilt wheels 160 and 161 plus roller 46 carrying belt 44 both would be up so that the sheet can be inserted for a substantial distance. Normally, where strictly manual feed is employed, the belt 34 will not be moving due to disengagement of the clutching mechanism 440 of FIGURES 7 and 22. Moreover, a normal pressure will be in chamber 60 at this time. Thus the sheet can be readily manipulated on the surface of belt 34 between slot 27 and roller 51. Even in a more automatic system, wherein the belt 34 will be moving and a negative pressure will be present in chamber 60 at this time, despite the tendency for the sheet to be moved forward by the belt, the sheet can be temporarily retained in any desired position for adjustment by direct manual holding of the sheet. As the sheet material passes underneath surface 41 of lens 37 by either manual movement or by movement of belt 34, the operator will need to accurately adjust the sheet until the bottom of a selected line of indicia, usually the first line, lies along the guide line 142 on the top surface of lens 37. If the sheet material is properly aligned, the selected line of indicia will lie parallel to lines 142, 141 and 140 of lens 37.

To effect such manual alignment with sufficient accuracy is difficult, especially when attempted by direct, hand-held manipulation of the sheet. So, to insure easier and more accurate manual alignment by indirect manipulation, the tilt wheels 160 and 161 are lowered by depressing the knob 22 to actuate through one of the pins 214 (as best shown in FIGURE 3), link 217, lever 204, lever arm 202, shaft 200 and lever 199 to move the bar 195. This bar which is tiltably mounted at 196, as shown in FIGURE 7, is depressed by the lever 199 (as shown in FIGURE 3) to move the rectangular frame 162 downwardly bringing the tilt wheels 160 and 161 into engagement with the paper. At the same time, the center roller 185 is moved into engagement with the paper. The bar 195 is held in depressed position by engagement with the catch 395 as shown in FIGURE 15. While the relay 354 is de-energized under these conditions, the electromagnet is nevertheless de-energized due to the presence of the capacitor 404 in series with the winding which capacitor has been charged and serves to block the passage of current to the electromagnet. With the tilt wheels 160 and 161 in engagement with the paper, any minute tilting adjustment of the paper which is deemed desirable can be made easily by the rotation of knob 21, which, as previously described, is effective through the gear train 230 and the flexible cable 234 (as shown in FIGURE 10) to rotate the bevel gear 174 (FIGURE 7). By pushing down on the knob 21, a thrust is transmitted through the flexible cable to the shaft 175 to move it against the action of the spring 178 so as to bring the bevel gear 174 into engagement with cooperating bevel gears 171 and 173. It will be readily apparent that under these conditions, the rotation of knob 21 will cause the bevel gears 171 and 173 to rotate in opposite directions to cause opposite rotation of the rollers 160 and 161. Thus, depending upon the direction of rotation of knob 21, the sheet just before it is clamped between belts 34 and 44, can be very easily and accurately adjusted as to tilt with respect to lines 142, 141 and 140 on lens 37 by manipulation of knob 21.

Once tilt adjustment is accomplished via knob 21 as just described, knob 22 can be used to effect precise alignment of the bottom of the selected line of indicia with guide line 142 on lens 37. Knob 22 is depressed and, if belt 34 had been in motion, driving power clutch 440 is de-energized and brake solenoid 485 is momentarily energized to stop the entire belt drive system and to then release it so it is free to be moved. Complete depression of knob 22 effects complete engagement of worm gear 471 with a mating worm gear section of gear 450 which has another spur gear section that meshes with spur gear 436 on the main drive ring. At the same time spur gear 470 meshes with spur gear 472 on the outer surface of knob 22 as shown in FIGURE 21. Thus, slightly rotating knob 22 also rotates the main drive ring very slightly so that belt 34 and the sheet carried by it move very slightly. This manual rotation of knob 22, when it is held in the fully depressed position, is used to precisely align the bottom of any line of indicia with guide line 142.

If the material is to be scanned in connection with character recognition, for example, the operator can then observe the size of the characters with reference to lines 141 and 142. As viewed from an eye location 15 to 30 inches above lens 37, the characters of the line should be greater than the distance between lines 141 and 142 but less than that between lines 140 and 142. If the sheet appears too wrinkled through lens 37 as previously explained or if the characters are too small or too large for the purpose for which the sheet is being inserted into the machine, the sheet can be readily withdrawn at this stage and then, at the option of the operator, the keyboard shown at the center of the console in FIGURE 1 can be used to manually enter the data from the sheet into the machine.

If, however, the sheet material is in satisfactory condition as far as wrinkling is concerned and if the characters are of proper size and if, at this time, the belts have not previously been placed in operation, the knob 24 is pressed downwardly to actuate switch 266 to connect relay winding 354 to its control circuit and also to cause deenergization of the brake solenoid 485 and energization of the clutch mechanism 440 to release the braking mechanism and to start the belt driving mechanism. As the sheet moves forwardly, the leading edge will pass between (if it is not already between) light 348 and light sensitive cell 345 as can be observed in FIGURE 3. The effect of this, as has been explained in connection with FIGURE 15, is to alter the input to the differential amplifier 353 to cause energization of the relay winding 354, switch 305 being closed under these conditions. The energization of relay winding 354 performs several functions, as previously pointed out. It causes engagement of movable contact 356 with fixed contact 360 to energize the solenoid 330 to pull arm 334 and shaft 325 in a counterclockwise direction, as viewed in FIGURE 15 and in a clockwise direction as viewed in FIGURE 3. As will be apparent from FIGURE 3, clockwise rotation of shaft 325 will move the yoke 327 downwardly to rock arm 60 downwardly and bring the roller 46 into the position shown in FIGURE 2 in which the sheet material is clamped between belts 34 and 44 with a pressure determined by the tension in spring 332, which may be adjustable, even though not shown adjustable in FIGURE 15.

With the sheet material clamped between belts 34 and 44, the sheet material is carried forwardly and at this same time subjected to a number of forces tending to remove any wrinkles from the sheet. As previously described, wrinkle hinge axes of the sheet are purposefully flexed backwardly and forwardly as it goes over the edge of the right-hand wall of chamber 60 under the roller 46, over the roller 51, over roller 52, (FIGURE 2) and under the roller 48. This process of flexing the wrinkle-hinge axes of the sheet back and forth tends to produce a condition of fatigue in any material within each hinge axis region so as to render the various wrinkles, especially the transverse wrinkles or folds of the sheet, less prone to self-recovery when the dewrinkling forces are removed therefrom. At the same time, the effect of belt 44, as described in connection with FIGURES 17, 18 and 19, imparts a spreading action to the paper; this action, being simultaneously from the center to each side, is especially effective in minimizing the longitudinal folds or wrinkles of the sheet. This is due to the herringbone waves 427 whose tips are bent backwardly, as shown in FIGURE 17 by waves 427b, 427c and 427d. Both as these herringbone waves reach the point under roller 46 where their tips are bent backwardly and again as these waves reach the point where their tips can again resume their normal position, as previously explained, they tend to produce spreading force vectors which act in a direction perpendicular to and to the left and right of the center line of belt 44 so as to tend to smooth the sheet from its center outwardly.

After passing under roller 48, the sheet material being processed passes in front of box 62 where it is held onto the belt by reason of the air pressure differential acting through the openings through belt 34 and the open space between the vanes 65 and the front portion of the box 62. In this region, between rollers 48 and 56, the paper or other sheet material is held firmly and relatively flat. As pointed out, it has been repeatedly flexed and smoothed out so that it should be quite free of wrinkles. Furthermore, the negative pressure in chamber 62 is uniformly applied to the sheet so as to hold it firmly against the belt 34. While the sheet material is passing in front of the box 62, it is operated on in any desired manner. For example, if the machine is a photographic device, it might be photographed at this time. In the particular embodiment shown, and for which the apparatus is particularly designed, there is intelligence on the sheet material which is scanned and fed to a logic mechanism to automatically detect and correct for the position of the intelligence and then read the intelligence. Referring to FIGURE 6, the vidicon camera tube 101, through the movement or fixed position of mirror 106, progressively scans varying or fixed portions of length ΔL of each line of intelligence within region L shown in FIGURE 6, the scanning action taking place by reason of electron beam deflecting means within the camera vidicon structure.

While the sheet material is passing through region H of FIGURE 2, the portion thereof being operated upon is visible as an image about twice actual size upon the translucent screen 75. As described above and as shown in connection with FIGURE 6a, the image on the screen 75 is viewed by the operator while he is sitting in his normal position centrally of the cabinet 10. As has been previously described, the image is projected on this screen through mirrors 77 and 78 and the angle that mirror 78 makes with respect to the screen 75 is so related to the angular position of the operator with respect to screen 75 that the intensity of the image on screen 75, as viewed by the operator, is high and remains substantially uniform. Due to the action of a shield 94 surrounding the screen 75 and to the possible use of special translucent optical material which is capable of transmitting only light received by it within a limited angular range, it is possible to prevent much of the outside light reaching screen 75 from being retransmitted by the mirrors 78 and 77 onto the sheet material.

After leaving region H, the sheet material passes between belts 45 and 34 and then it is normally held in engagement with belt 34 by negative pressure in box 126 so that no sheet of input material leaves the carrier belt 34 until that sheet reaches the opening of the hopper 110. At this position, it is subjected to pressure through a tube 135 which blows the sheet away from the belt 34 so that it drops down into the hopper 110 where it stacks up in the lower portion 113 until removed.

The operator may observe that the sheet is defective in some way. Or in the case where the material handling apparatus is part of a character recognition system and there is realization that the intelligence on the sheet cannot be read, a signal to that effect will be received from the character recognition portion of the apparatus. When the operator recognizes that the sheet material requires rejection to hopper 111, he would depress knob 23 and thus actuate switch 296 (shown in FIGURES 2 and 13) via pin 290 and plunger 291. Where rejection is signaled automatically, the switch 137 of FIGURE 2 is closed at the proper time. Either of switches 296 or 137 actuate valve 128 to apply positive pressure instead of negative pressure to the chamber 126. Under these circumstances, as the sheet material is carried by belt 34 past roller 58, the pressure in chamber 126 keeps the sheet material blown away from the belt 34 causing the sheet to enter the hopper 111.

If the operator wishes to manually remove a sheet being fed either rapidly by hand or automatically while the lower portion of that sheet still extends far enough out of input slot 27 to grasp easily, he would simply depress rod 297 projecting from the center of knob 23 in FIGURE 13. This would actuate the precision snap switch 305 to release relay 354 and thus release both frame 162 carrying wheels 160 and 161 and also roller 46 from their clamped down positions. It would also actuate spool valve 308 to put a positive pressure in chamber 60 so that the sheet would be forced off belt 34 in the entrance region. Then the sheet could be easily withdrawn from slot 27.

Whenever the sheet material has progressed to a point in its travel where the trailing edge of it has passed from the area between light 348 and light sensitive cell 345, the differential amplifier 353 is effective to respond to the increased intensity of illumination of light sensitive cell 345 to cause de-energization of relay 354. As previously pointed out, despite the fact that the lowering of roller 46 reduces the amount of light passing from light 341 to light sensitive cell 345, his is compensated for by changing the comparison voltage input to the differential amplifier 353. This voltage, to which the voltage from light sensitive cell 345 is compared, is changed, when the relay 354 was first pulled in, by switching this amplifier 353 comparison voltage input from a slider on potentiometer 377 to a slider on potentiometer 391.

When relay 354 drops out, solenoid 330 is de-energized to permit shaft 325, as viewed in FIGURE 3, to rotate in a clockwise direction so that roller 46 now again assumes the position shown in FIGURE 3.

The dropping out of the relay 354 also results in the movable contact 357 moving into engagement with contact 359, as shown in FIGURE 15 to cause the momentary energization of electromagnet 339 through the capacitor 404. This will cause the catch 395 to be released momentarily, permitting the depressor bar 195 to move upwardly and permit the rectangular frame 162 to move upwardly to a position in which the rollers 160, 161 and 185 are no longer in engagement with the sheet material.

In the foregoing explanation, it has been assumed that one sheet at a time is fed into the machine and that this sheet is allowed to move through the machine before another sheet is inserted. As has been pointed out above, the apparatus is designed to be operated so that the sheet material can be automatically fed. While I have shown no specific automatic feeding mechanism in the present application, one such mechanism can be coupled into my apparatus by removing plate 25 together with the rectangular frame 162, the rollers 160 and 161 carried thereby and by disconnecting the cable 235 from the shaft 175. When this is done, the automatic feeding mechanism may be fastened into place in the space previously occupied by this mechanism and by the space immediately behind the front panel of the apparatus. A second suitable automatic feeding mechanism can be mounted on cabinet surfaces 20 and 11 between knobs 20 and 24 so as to feed sheets directly and automatically into slot 27. Still another suitable automatic feeding mechanism, which involves a vacuum transfer drum positioned in tangential contact with belt 34 approximately one-third of the distance between roller 54 and roller 50 in FIGURES 2 and 20, can be mounted so as to project through a removable plate opening, not shown, in panel 11.

Regardless of whether a mechanism is provided for automatically feeding sheet material or not, it may be desirable at times to leave the rollers 160 and 161 permanently depressed and even to drive these rollers. Whether or not the rollers 160 and 161 are driven, provision can be made for braking these rollers, for some tilt adjustment control during hand or automatic feeding, by having a braking solenoid operate a braking member associated with each of the rollers as shown in FIGURES 11 and 12. The switches 281 and 282 of FIGURES 13 and 14 are selectively energized depending upon the rotation of the knob 23 to energize one or the other of the solenoids associated with these brakes. It is obvious that when one or the other of the two brakes is energized, the other wheel being continuously driven directly or just idling in contact with belt 34, a tilting action will be imparted to the paper as it is carried by belt 34. This tilting action can be so controlled manually as to produce any desired tilt correction. Where it is desired to continuously drive the rollers, the rollers can be driven through a differential mechanism. In this case, the braking of one or the other of the two rollers 160 and 161 will cause the other to move even faster and thus cause a more rapid tilting of the sheet material.

*Conclusion*

It will be seen from the foregoing that I have provided a novel feeding apparatus for sheet material in which provision is made for checking in various manners the condition and position of the sheet material and any indicia appearing thereon as it is introduced into the apparatus. Provision is further made for removing wrinkles from the sheet material prior to the time that it reaches a processing position. Provision is further made for accurately positioning this sheet material in a number of manners. The apparatus also has means for readily observing the portion of the indicia on the sheet material being processed. Provision is also made for selectively directing the sheet material into either of various hoppers depending upon whether the manner in which the sheet material has been treated. It will also be seen that my apparatus provides control at all times of the sheet material so that the feeding thereof can be abruptly stopped whenever necessary and can be reversed, if that is also necessary. Furthermore, despite the numerous means for controlling the position and alignment of the sheet material, this is accomplished by only two knob assemblies readily accessible to the operator.

It will further be observed that I have provided a feeding apparatus for sheet material which is particularly adaptable for use in connection with a character recognition system.

While I have shown a specific embodiment of my invention for purposes of illustration, it is to be understood that the invention is limited solely by the scope of the appended claims.

I claim:
1. Apparatus for feeding sheet material having at least one row of indicia thereon, comprising
   a passageway for passage of said sheet material,
      and an elongated magnifying lens element disposed adjacent said passageway with one optical surface thereof directed towards said passageway so as to be exposed to the indicia on any such sheet material in said passageway and a second optical surface thereof disposed so that a selected row of indicia can be readily viewed therethrough,
         said second surface of said lens element having a guide line thereon for indicating whether the sheet material is so disposed that the selected row of indicia is parallel to the longitudinal axis of said lens element.

2. Apparatus for feeding sheet material having at least one row of indicia thereon, comprising
a passageway for passage of said sheet material,
and an elongated magnifying lens element disposed adjacent said passageway with one optical surface thereof directed towards said passageway so as to be exposed to the indicia on any such sheet material in said passageway and a second optical surface thereof disposed so that a selected row of indicia can be readily viewed therethrough,
said elongated lens element extending transversely of the direction of passage of said sheet material and being of a character to magnify in a direction transverse to the longitudinal axis of the lens and thus in a direction parallel to the passage of the sheet material.

3. Apparatus for feeding sheet material having at least one row of indicia thereon, comprising
a passageway for passage of said sheet material,
an elongated magnifying lens element disposed adjacent said passageway with one optical surface thereof directed towards said passageway so as to be exposed to the indicia on any such sheet material in said passageway and a second optical surface disposed so that a selected row of indicia can be readily viewed therethrough,
said second surface of said lens element having a guide line thereon for indicating whether the sheet material is so disposed that the selected row of indicia is parallel to the longitudinal axis of said lens element,
and means for tiltably adjusting said sheet material until said selected row of indicia is parallel to said longitudinal axis of said lens element.

4. Apparatus for feeding sheet material having at least one row of indicia thereon, comprising
a passageway for passage of said sheet material,
and an elongated magnifying lens element disposed adjacent said passageway with one optical surface thereof directed towards said passageway so as to be exposed to the indicia on any such sheet material in said passageway and a second optical surface thereof disposed so that a selected row of indicia can be readily viewed therethrough,
said second surface of said lens element having a plurality of parallel longitudinal lines thereon having a predetermined spacing therebetween the dimensions of which are determined by the desired size limit of said indicia for indicating whether the sheet material is so disposed that said selected row of printed indicia is parallel to the longitudinal axis of said lens element and whether the indicia is within predetermined size limits in a direction perpendicular to the longitudinal direction of the row.

5. Apparatus for feeding sheet material having at least one row of indicia thereon, comprising:
a passageway for passage of said sheet material,
and an elongated magnifying lens element disposed adjacent said passageway with first and second optical surfaces,
said first optical surface being directed toward said passageway so as to be exposed to any such indicia in such passageway and having transverse lines thereon for indicating the disposition of the indicia in a longitudinal direction,
and said second optical surface being disposed so that said transverse lines and a selected row of indicia can be readily viewed therethrough, said second surface of said lens element having a longitudinal line thereon for indicating whether the sheet material is so disposed that said selected row of indicia is parallel to the longitudinal axis of said lens element.

6. Apparatus for feeding sheet material having at least one row of indicia thereon, comprising:
a passageway for passage of said sheet material,
an elongated lens element disposed adjacent said passageway with one optical surface thereof directed towards said passageway so as to be exposed to the indicia on any such sheet material in said passageway and a second optical surface thereof disposed so that a selected row of indicia can be readily viewed therethrough,
said second surface of said lens element having a guide line thereon for indicating whether the sheet material is so disposed that said selected row of printed indicia is parallel to the longitudinal axis of said lens element,
means in said passageway for tiltably adjusting said sheet material until said selected row of indicia is parallel to said longitudinal axis of said lens element,
and means located outside of said passageway for controlling said last named adjusting means.

7. Apparatus for feeding sheet material having at least one row of indicia thereon, comprising:
a passageway for passage of said sheet material,
an elongated lens element disposed adjacent said passageway with one optical surface thereof directed towards said passageway so as to be exposed to the indicia on any such sheet material in said passageway and a second optical surface thereof disposed so that a selected row of indicia can be readily viewed therethrough,
said second surface of said lens element having a longitudinal line thereon for indicating whether the sheet material is so disposed that said selected row of printed indicia is parallel to the longitudinal axis of said lens element,
means providing a plurality of spaced surfaces for engaging said sheet at transversely spaced points,
and means for differentially adjusting the effect exerted by said spaced surfaces upon said sheet material to tilt said sheet material until said selected row of indicia is parallel to said longitudinal axis of said lens element.

8. Apparatus for feeding sheet material having at least one row of indicia thereon, comprising:
a passageway for passage of said sheet material,
means for indicating whether the sheet material is so disposed that a selected row of printed indicia extends in the desired direction,
means providing a plurality of spaced surfaces engaging said sheet at transversely spaced points,
and means for differentially adjusting the effect exerted by said spaced surfaces upon said sheet material to tilt said sheet material until said selected row of indicia extends in the desired direction.

9. Apparatus for feeding sheet material having at least one row of indicia thereon, comprising:
a passageway for passage of said sheet material,
means for indicating whether the sheet material is so disposed that a selected row of printed indicia extends in the desired direction,
means providing a plurality of spaced rollers for engaging said sheet at transversely spaced points,
and means for differentially adjusting the effect exerted by said spaced rollers upon said sheet material to tilt said sheet material until said selected row of indicia extends in the desired direction.

10. The apparatus of claim 9 in which the means for differentially adjusting said rollers is effective to rotate said rollers in opposite directions.

11. The apparatus of claim 9 in which the means for differentially adjusting said rollers is effective to stop the rotation of one of said rollers while permitting the other to rotate.

12. The apparatus of claim 9 in which the means for differentially adjusting said rollers is effective to stop the rotation of one of said rollers and to cause the rate of rotation of the other roller to increase.

13. Apparatus for feeding sheet material, comprising:
a passageway for passage of said sheet material,
means for indicating whether the sheet material is correctly disposed in said passageway,
tilt correction means adapted to be moved into engagement with said sheet material for tilting the same to a desired angular position,
means for holding said tilt correction means in engagement with said sheet as it passes through said apparatus,
paper feeding means having two sheet material engaging portions which are adapted to be brought together to engage said sheet material,
and radiation sensitive means responsive to the presence of sheet material at a predetermined point in said passageway effective upon a piece of said sheet material passing beyond said predetermined point to release said means for holding the tilt correction means and for causing separation of said sheet material engaging portions to better permit the entry of a new piece of sheet material.

14. Apparatus for feeding sheet material, comprising:
a passageway for passage of said sheet material,
means for indicating whether the sheet material is correctly disposed in said passageway,
tilt correction means adapted to be moved into engagement with said sheet material for tilting the same to a desired angular position,
means for holding said tilt correction means in engagement with said sheet as it passes through said apparatus,
paper feeding means having two sheet material engaging portions which are adapted to be brought together to engage said sheet material,
and radiation sensitive means responsive to the presence of sheet material at a predetermined point in said passageway effective upon a piece of said sheet material reaching said predetermined point to cause said sheet material engaging portions to be brought together to engage said sheet material,
said radiation sensitive means being effective upon the piece of sheet material passing beyond said predetermined point to release said means for holding the tilt correction means and for causing separation of said sheet material engaging portions to better permit the entry of a new piece of sheet material.

15. Apparatus for feeding sheet material having visible intelligence thereon, comprising:
a housing,
a passageway in said housing for passage of said sheet material,
a sheet material feeding means in said housing comprising two driven belts,
a first of said belts being relatively long and adapted to engage the sheet material over a substantial portion of its travel through the apparatus after insertion into said passageway,
a second of said belts extending adjacent to said first belt over only a limited portion of the travel of said first belt and adapted to engage the sheet material while the latter is passing between said belts,
a negative pressure chamber immediately adjacent the first belt opposite the surface thereof engaging said sheet material and extending over a portion of the travel of said first belt subsequent to said limited portion of its travel adjacent said second belt,
said first belt being sufficiently foraminous that the effect of the negative pressure in said chamber extends through said first belt under the surface of the sheet material to create a differential pressure effect between the top surface and under surface of the sheet to firmly hold it against said first belt in a relatively wrinkle free manner after it passes from engagement with said second belt,
a viewing screen in a wall of said housing,
and means for projecting onto said viewing screen at least a portion of the intelligence on said sheet material while said sheet material is held against said first belt by said negative pressure chamber.

16. Apparatus for feeding sheet material having visible intelligence thereon, comprising:
a housing,
a passageway in said housing for passage of said sheet material,
a sheet material feeding means in said housing comprising a driven belt adapted to engage the sheet material during a portion of its travel through the apparatus after insertion into said passageway,
a negative pressure chamber immediately adjacent said belt opposite the surface thereof engaging said sheet material and extending over a portion of the travel of said belt,
said belt being sufficiently foraminous that the effect of the negative pressure in said chamber extends through said belt under the surface of the sheet material to create a differential pressure effect between the top surface and under surface of the sheet to firmly hold it against said belt while it passes a viewing region,
a viewing screen in a wall of said housing,
and means for projecting onto said viewing screen at least a portion of the intelligence on said sheet material while said sheet material is held against said belt by said negative pressure.

17. Apparatus for feeding sheet material having visible intelligence thereon, comprising:
a housing having a front wall and a central portion adjacent which an operator is to be seated,
means within the housing for moving an inserted piece of such sheet material through said housing past a display area within the housing,
means within said housing for responding to the intelligence upon the sheet material while it is passing said display area,
a viewing screen in the front wall of said housing disposed to one side of said central portion,
and reflective means positioned at an angle relative to said display area and said viewing screen for projecting onto said viewing screen at least a portion of the intelligence on said sheet material while said sheet material is passing said display area,
the angular disposition of said reflective means with respect to said screen being such as to tend to provide an undistorted and uniform intensity of the image on the screen as viewed by the operator even though the screen is not directly in front of the operator.

18. The apparatus of claim 17 further comprising:
means within the housing for visually tiltably adjusting said sheet material until said visible intelligence on said sheet material is in a predetermined alignment position for aligned passage through said display area.

19. Apparatus for feeding sheet material having at least one row of indicia thereon, comprising:
- a housing for said apparatus,
    - a passageway in said housing for passage of said sheet material,
    - means for indicating exteriorly of said housing whether the sheet material is so disposed that a selected row of printed indicia extends in the desired direction,
- tilt correction means adapted to be moved into engagement with said sheet material for tilting the same to a desired angular position,
    - said tilt correction means comprising a plurality of spaced surfaces adapted to engage said sheet at transversely spaced points,
        - means for differentially adjusting the effect exerted by said spaced surfaces to tilt said sheet material until said selected row of indicia is transversely aligned as desired,
- and a knob assembly secured to the housing and accessible exteriorly thereof,
    - said knob assembly being operable upon movement of a portion thereof in one manner to bring said tilt correction means into engagement with the sheet material and upon movement of a portion thereof in a different manner to cause operation of said differential adjusting means to tilt said sheet material.

20. The apparatus of claim 19 in which said knob assembly comprises two concentric knobs, one of which is moved in a particular manner to bring the tilt correction means into engagement with the sheet material and the other of which is moved in a particular manner to cause operation of said differential adjusting means.

21. The apparatus of claim 19 in which said knob assembly comprises two concentric knobs, the first of which is pushed inwardly to bring the tilt correction means into engagement with the sheet material and is rotatable when pushed inwardly to move the sheet material either forwardly or backwardly, and the second of which is pushed inwardly and rotated to cause operation of said differential adjusting means.

22. Apparatus for feeding sheet material, comprising:
- a housing for said apparatus,
    - a passageway in said housing for passage of said sheet material,
    - means for indicating exteriorly of said housing whether the sheet material is so disposed that a selected row of printed indicia is transversely aligned as desired,
- tilt correction means including a pair of spaced rollers for engaging said sheet at transversely spaced points,
    - means for moving said tilt correction means to bring said rollers into engagement with said sheet material,
    - means for differentially applying a braking force to one or the other of said rollers to tilt said sheet material until said selected row of indicia extends in the desired direction,
- and a knob assembly secured to said housing and accessible exteriorly thereof,
    - said knob assembly being operable, upon movement of a portion thereof in one manner, to selectively cause braking of one or the other of said rollers and, upon movement of a portion thereof in a different manner, to cause release of said tilt correction means to free the rollers from engagement with said sheet material.

23. The apparatus of claim 22 in which the knob assembly includes a first knob which when rotated selectively causes braking of one or the other of said rollers and a further knob which, upon being moved inwardly, causes release of said tilt correction means.

24. Apparatus for feeding sheet material, comprising:
- a housing for said apparatus,
    - a passageway in said housing for passage of said sheet material,
        - sheet material feeding means comprising a driven belt adapted to engage sheet material inserted into said passageway,
    - means for indicating exteriorly of said housing whether the sheet material is so disposed that a selected row of printed indicia is aligned as desired,
        - tilt correction means including a pair of spaced surfaces for engaging said sheet at transversely spaced points,
            - means for moving said tilt correction means to bring said spaced surfaces into engagement with said sheet material,
            - means for maintaining the sheet material in engagement with said belt prior to said spaced surfaces being brought into engagement with said sheet material,
            - means for differentially altering the effect exerted by said spaced surfaces upon said sheet material to tilt said sheet material until said selected row of indicia is aligned as desired,
- and a knob assembly secured to said housing and accessible exteriorly thereof,
    - said knob assembly being operable upon movement of a portion thereof in one manner, to selectively cause operation of said means for differentially altering the effect of said spaced surfaces and, upon movement of a portion thereof in a different manner, to cause release of said tilt correction means to free the spaced surfaces from engagement with said sheet material and to render ineffective said means for maintaining the sheet material in engagement with said belt.

References Cited

UNITED STATES PATENTS

| | | | |
|---|---|---|---|
| 2,994,964 | 8/1961 | Moffet | 33—184.5 |
| 3,094,063 | 6/1963 | Benson | 88—24 |

NORTON ANSHER, *Primary Examiner.*

RICHARD A. WINTERCORN, *Assistant Examiner.*

UNITED STATES PATENT OFFICE
CERTIFICATE OF CORRECTION

Patent No. 3,358,554                      December 19, 1967

John G. Benjamin

It is hereby certified that error appears in the above numbered patent requiring correction and that the said Letters Patent should read as corrected below.

Column 23, line 44, for "negaitve" read -- negative --; column 25, line 31, for "repeatedlp" read -- repeatedly --; column 31, line 16, for "for" read -- far --; column 36, line 9, for "rolers" read -- rollers --; line 66, for "tow" read -- two --; column 37, line 2, after "gears" insert -- 470 and --; line 19, for "obivous" read -- obvious --; line 40, for "maner" read -- manner --; column 43, line 7, for "gaugng" read -- gauging --; column 44, line 7, for "mechansm" read -- mechanism --; line 39, after "204," insert -- link 203, --; column 47, line 34, for "his" read -- this --; column 54, line 59, for "3,094,063" read -- 3,094,036 --.

Signed and sealed this 27th day of May 1969.

(SEAL)
Attest:

EDWARD M. FLETCHER, JR.
Attesting Officer

Commissioner of Patents